United States Patent
Ota et al.

(10) Patent No.: US 8,064,163 B2
(45) Date of Patent: Nov. 22, 2011

(54) PERPENDICULAR MAGNETIC WRITE HEAD HAVING A THIN FILM COIL GENERATING A MAGNETIC FLUX AND METHOD OF MANUFACTURING PERPENDICULAR MAGNETIC WRITE HEAD, AND MAGNETIC WRITE DEVICE

(75) Inventors: Norikazu Ota, Tokyo (JP); Tetsuya Roppongi, Tokyo (JP); Yuichi Watabe, Tokyo (JP)

(73) Assignee: TDK Corporation, Tokyo (JP)

( * ) Notice: Subject to any disclaimer, the term of this patent is extended or adjusted under 35 U.S.C. 154(b) by 975 days.

(21) Appl. No.: 12/010,160

(22) Filed: Jan. 22, 2008

(65) Prior Publication Data
US 2008/0180858 A1 Jul. 31, 2008

(30) Foreign Application Priority Data
Jan. 31, 2007 (JP) .................................. 2007-020819

(51) Int. Cl.
*G11B 5/147* (2006.01)
(52) U.S. Cl. ................................................ 360/125.08
(58) Field of Classification Search .................... None
See application file for complete search history.

(56) References Cited

U.S. PATENT DOCUMENTS
7,433,152 B2 * 10/2008 Watabe et al. ........... 360/125.08

| | | | |
|---|---|---|---|
| 2006/0002025 A1 | 1/2006 | Takahashi et al. |
| 2006/0098338 A1 | 5/2006 | Watabe et al. |
| 2006/0171072 A1 | 8/2006 | Watabe et al. |
| 2007/0115594 A1 | 5/2007 | Takahashi et al. |

FOREIGN PATENT DOCUMENTS
| EP | 0 360 978 B1 | 4/1990 |
|---|---|---|
| JP | A 2-66710 | 3/1990 |
| JP | A 2001-250204 | 9/2001 |
| JP | A 2002-197615 | 7/2002 |
| JP | A 2006-155866 | 6/2006 |
| JP | A-2006-331612 | 12/2006 |

* cited by examiner

Primary Examiner — David D Davis
(74) Attorney, Agent, or Firm — Oliff & Berridge, PLC

(57) ABSTRACT

Provided are a perpendicular magnetic write head capable of achieving the high performance and stability in the writing performance, and a method of manufacturing the same. On a trailing side of a main magnetic pole layer, disposed are a gap layer extending backward from an air bearing surface and an auxiliary magnetic pole layer extending backward from a position recessed from the air bearing surface. The auxiliary magnetic pole layer is partially overlapped on the gap layer. In case the auxiliary magnetic pole layer is formed using etching method in the process of manufacturing the perpendicular magnetic write head, the gap layer has a function as an etching stopper layer so that the main magnetic pole layer is protected; thereby the already-formed main magnetic pole layer is not subjected to etching.

11 Claims, 17 Drawing Sheets

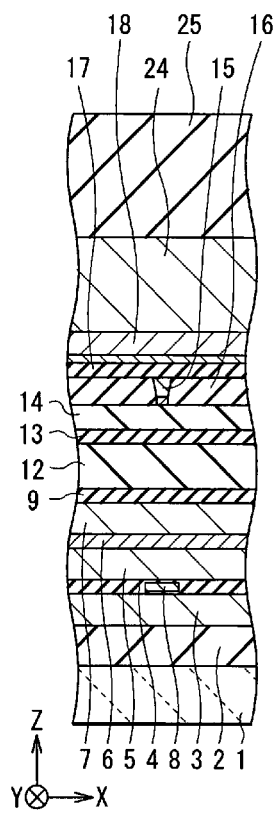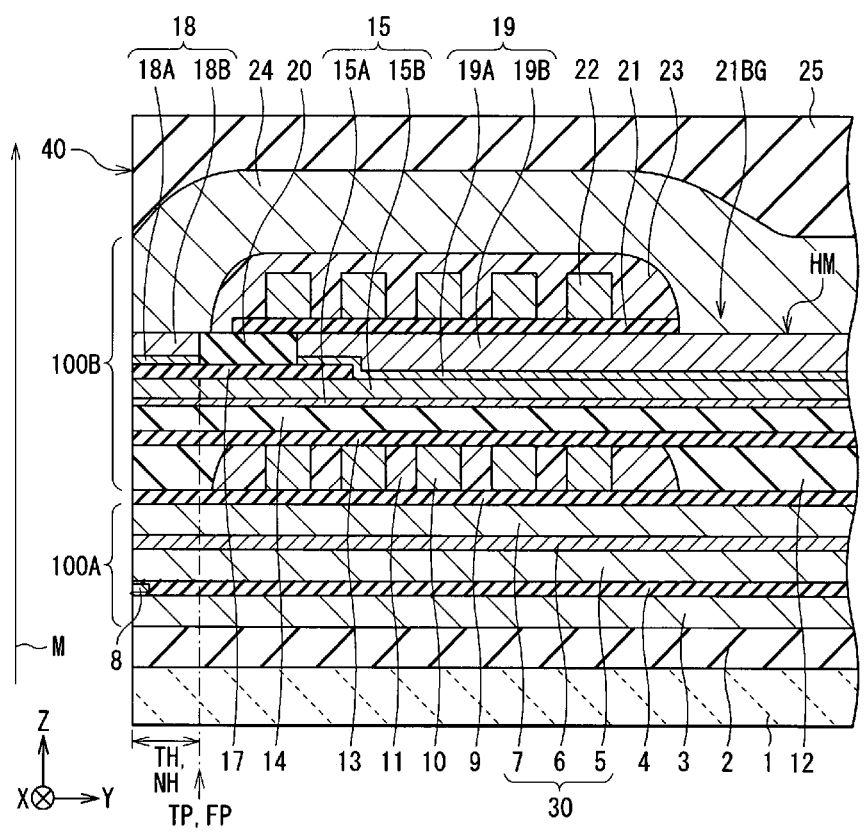
FIG. 1A
FIG. 1B

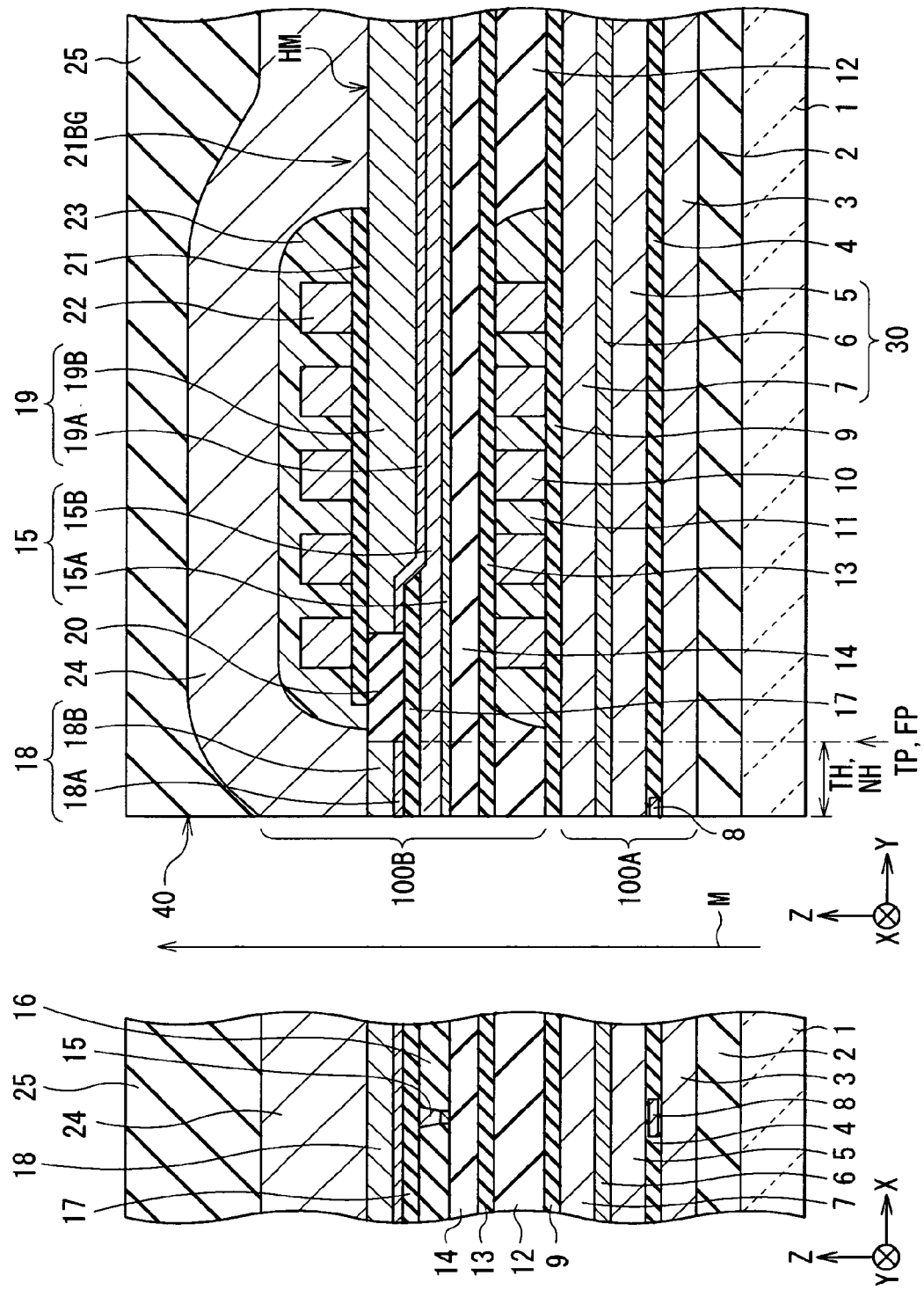

PERPENDICULAR MAGNETIC WRITE HEAD HAVING A THIN FILM COIL GENERATING A MAGNETIC FLUX AND METHOD OF MANUFACTURING PERPENDICULAR MAGNETIC WRITE HEAD, AND MAGNETIC WRITE DEVICE

CROSS REFERENCES TO RELATED APPLICATIONS

The present invention contains subject matter related to Japanese Patent Application JP 2007-020819 filed in the Japanese Patent Office on Jan. 31, 2007, the entire contents of which being incorporated herein by Reference.

BACKGROUND OF THE INVENTION

1. Field of the Invention

The present invention relates to a perpendicular magnetic write head performing a writing process of perpendicular magnetic writing method and a method of manufacturing the same, and a magnetic write device equipped with such a perpendicular magnetic write head.

2. Description of the Related Art

In recent years, with improvement of the areal recording density of a magnetic recording medium (hereinafter, simply referred to as a "recording medium") such as a hard disk, performance improvement is desirable in a thin film magnetic head equipped on a magnetic write device such as a hard disk drive. As a writing method of the thin film magnetic head, there is known a longitudinal writing method setting a direction of a signal magnetic field in an in-plane direction (longitudinal direction) of the recording medium. There is also known a perpendicular writing method setting the direction of the signal magnetic field in the direction intersecting a surface of the recording medium. The longitudinal writing method has been widely used today. However, in consideration of the market trend with the improvement of the areal recording density, the perpendicular writing method is envisaged to be promising instead of the longitudinal writing method. This is because, in the perpendicular writing method, such advantages can be obtained that a liner recording density is increased, and further that the recording medium which has been subjected to recording is hardly influenced by a thermal fluctuation.

The thin film magnetic head of the perpendicular writing method (hereinafter, referred to as a "perpendicular magnetic write head") is provided with a thin film coil generating a magnetic flux for writing, and a main magnetic pole layer leading the magnetic flux generated in the thin film coil to the recording medium. According to the perpendicular magnetic write head, the recording medium is magnetized by the magnetic field generated by the magnetic flux for writing (the perpendicular magnetic field); thereby information is magnetically recorded on the recording medium.

As the perpendicular magnetic write head, there is known the perpendicular magnetic write head provided with the main magnetic pole layer extending in the direction intersecting an air bearing surface. This type of the perpendicular magnetic write head is generally referred to as a "single magnetic pole type head". As a specific structure of the single magnetic pole type head, there is known the structure that an auxiliary magnetic pole layer is located adjacent to the main magnetic pole layer so as to increase the intensity of a perpendicular magnetic field. (For example, refer to Japanese Unexamined Patent Publication No. Hei-02-066710 and Japanese Unexamined Patent Publication No. 2002-197615).

However, it is said that the single magnetic pole type head has a limitation to improve the recording density of the recording medium.

Thus, in recent years, in order to achieve the improvement in the recording density, the perpendicular magnetic write head with a write shield layer is entering the mainstream. The write shield layer is for absorbing the spread component of the magnetic flux released from the main magnetic pole layer, and is located away from the main magnetic pole layer with a gap layer in between. This type of the perpendicular magnetic write head is generally referred to as a "shield type head". As a specific structure of the shield type head, there is known the structure that the write shield layer is disposed on the trailing side of the main magnetic pole layer (for example, refer to Japanese Unexamined Patent Publication No. 2001-250204 and European Patent Publication No. 0360978)

In particular, as the structure of the shield type head, there is known the structure that the auxiliary magnetic pole layer is provided on the trailing side of the main magnetic pole layer so as to suppress the unintentional erase of the information recorded on the recording medium during writing process (for example, refer to Japanese Unexamined Patent Publication No. 2006-155866).

SUMMARY OF THE INVENTION

However, in the process of manufacturing the shield type head of the related art, in case the auxiliary magnetic pole layer is formed using etching method, the already-formed main magnetic pole layer also may be unintentionally subjected to etching due to the dimension error and the position error of the auxiliary magnetic pole layer. There arises a problem that deterioration and unstability of the writing performance may be caused. That is, with the recent trend that the thickness of the main magnetic pole layer is decreased more and more, even slight decrement of thickness of the main magnetic pole layer in comparison with a designed value has a bad influence on a flow of the magnetic flux. Thereby, the desired writing performance is unobtainable.

As reasons causing deterioration and unstability of the writing performance in the shield type head of the related art, there are factors in point of manufacturing that are described above. Also, after completion of the shield type head, there are factors in point of performance that the intensity of the perpendicular magnetic field is insufficient, and a failure, so-called pole erasure, likely occurs. Here, the term "pole erasure" means a phenomenon that the information recorded on the recording medium is unintentionally erased by a leakage of a remanent magnetization in the main magnetic pole layer in a period of no electrical input.

In view of the foregoing, it is desirable to provide the perpendicular magnetic write head capable of achieving high performance and stability in the writing performance and a method of manufacturing the same, and a magnetic write device.

The perpendicular magnetic write head according to an embodiment of the present invention is provided with a thin film coil generating a magnetic flux, a main magnetic pole layer extending backward from the air bearing surface facing onto a recording medium and leading the magnetic flux generated in the thin film coil to the recording medium, a gap layer extending backward from the air bearing surface on the trailing side of the main magnetic pole layer, and an auxiliary magnetic pole layer extending backward from the position recessed from the air bearing surface on the trailing side of the main magnetic pole layer. The auxiliary magnetic pole layer is partially overlapped on the gap layer. Also, the magnetic write device according to an embodiment of the present invention is equipped with the recording medium and the perpendicular magnetic write head which writes the information on the recording medium, the perpendicular magnetic write head having the above-described configuration.

The method of manufacturing the perpendicular magnetic write head according to an embodiment of the present invention is the method of manufacturing the perpendicular magnetic write head provided with the thin film coil generating the magnetic flux, the main magnetic pole layer leading the magnetic flux generated in the thin film coil to the recording medium, and the gap layer and the auxiliary magnetic pole layer disposed on the trailing side of the main magnetic pole layer. The method of manufacturing the perpendicular magnetic write head includes steps of forming the main magnetic pole layer extending backward from an air bearing surface facing onto a recording medium; forming the gap layer extending backward from the air bearing surface on the main magnetic pole layer; forming a seed layer covering the main magnetic pole layer and the gap layer, the seed layer being used for deposition of a plating layer; selectively depositing the plating layer extending backward from a position recessed from the air bearing surface on the seed layer and partially overlapped on the gap layer; and selectively removing the seed layer using the plating layer as a mask, thereby forming the auxiliary magnetic pole layer including the seed layer and the plating layer.

In the perpendicular magnetic write head and the method of manufacturing the same, and the magnetic write device, the auxiliary magnetic pole layer is disposed on the trailing side of the main magnetic pole layer. For example, unlike the case where the auxiliary magnetic pole layer is disposed on the leading side of the main magnetic pole layer, as long as the write shield layer is disposed on the trailing side of the main magnetic pole layer, although a part of the magnetic flux accommodated in the auxiliary magnetic pole layer is likely released externally and directly from the air bearing surface without passing through the main magnetic pole layer, the magnetic flux is absorbed by the write shield layer so that the magnetic flux is hardly released externally from the air bearing surface. Thus, the unnecessary magnetic flux is hardly generated, and the recording medium is hardly remagnetized by the unnecessary magnetic flux. Moreover, on the trailing side of the main magnetic pole layer, the gap layer extending backward from the air bearing surface, and the auxiliary magnetic pole layer extending backward from the position recessed from the air bearing surface are provided. The auxiliary magnetic pole layer is partially overlapped on the gap layer. In case the auxiliary magnetic pole layer is formed using etching method in the process of manufacturing the perpendicular magnetic write head, the gap layer has a function as an etching stopper layer so that the main magnetic pole layer is protected; thereby the already-formed main magnetic pole layer is not subjected to etching. In the process of forming the auxiliary magnetic pole layer, the thickness of the magnetic pole layer is maintained as the designed value; thereby the magnetic flux saturation hardly occurs in the main magnetic pole layer.

The perpendicular magnetic head according to an embodiment of the present invention has the following features. First, the rear edge of the gap layer is preferably located backward from the front edge of the auxiliary magnetic pole layer. Second, the distance from the air bearing surface to the auxiliary magnetic pole layer is preferably in the range of 0.6 μm to 3.0 μm, and more preferably in the range of 0.8 μm to 3.0 μm. Third, further, the return yoke layer may be provided extending backward from the air bearing surface on the trailing side of both the gap layer and the auxiliary magnetic pole layer. Also the write shield layer may be provided to be included in the same layer level as the auxiliary magnetic pole layer, in the region close to the air bearing surface between the gap layer and return yoke layer. The width, in the write track width direction on the air bearing surface, of the write shield layer is preferably larger than that of the main magnetic pole layer. Fourth, further, a first insulating layer may be provided filled between the auxiliary magnetic pole layer and the write shield layer, and defining a throat height with the position adjacent to the write shield layer. Also, a second insulating layer may be provided disposed on the trailing side of the first insulating layer, and burying the thin film coil. Preferably, the front edge of the second insulating layer is located backward from the front edge of the first insulating layer, and the front edge of the auxiliary magnetic pole layer is located backward from the front edge of the second insulating layer.

In the magnetic write device according to an embodiment of the present invention, the recording medium may have a stacked configuration including a magnetization layer and a soft magnetic layer.

In the perpendicular magnetic write head and the method of manufacturing the same, and the magnetic write device according to an embodiment of the present invention, the auxiliary magnetic pole layer is disposed on the trailing side of the main magnetic pole layer. Thus, for example, as long as the write shield layer is disposed on the trailing side of the main magnetic pole layer, the pole erasure can be suppressed. Moreover, the auxiliary magnetic pole layer is partially overlapped on the gap layer on the trailing side of the main magnetic pole layer so that the magnetic flux saturation hardly occurs in the main magnetic pole layer. Therefore, the high performance and stability in the writing performance can be achieved.

Other and further objects, features and advantages of the invention will appear more fully from the following description.

BRIEF DESCRIPTION OF THE DRAWINGS

FIGS. 1A and 1B are cross sectional views showing the cross sectional configuration of a thin film magnetic head including a perpendicular magnetic write head according to an embodiment of a present invention.

FIGS. 13A and 13B are cross sectional views showing another modification regarding the configuration of the thin film magnetic head.

DETAILED DESCRIPTION OF THE PREFERRED EMBODIMENT

Hereinafter, a preferred embodiment of the present invention will be described in detail with reference to the accompanying drawings.

Figure 2:
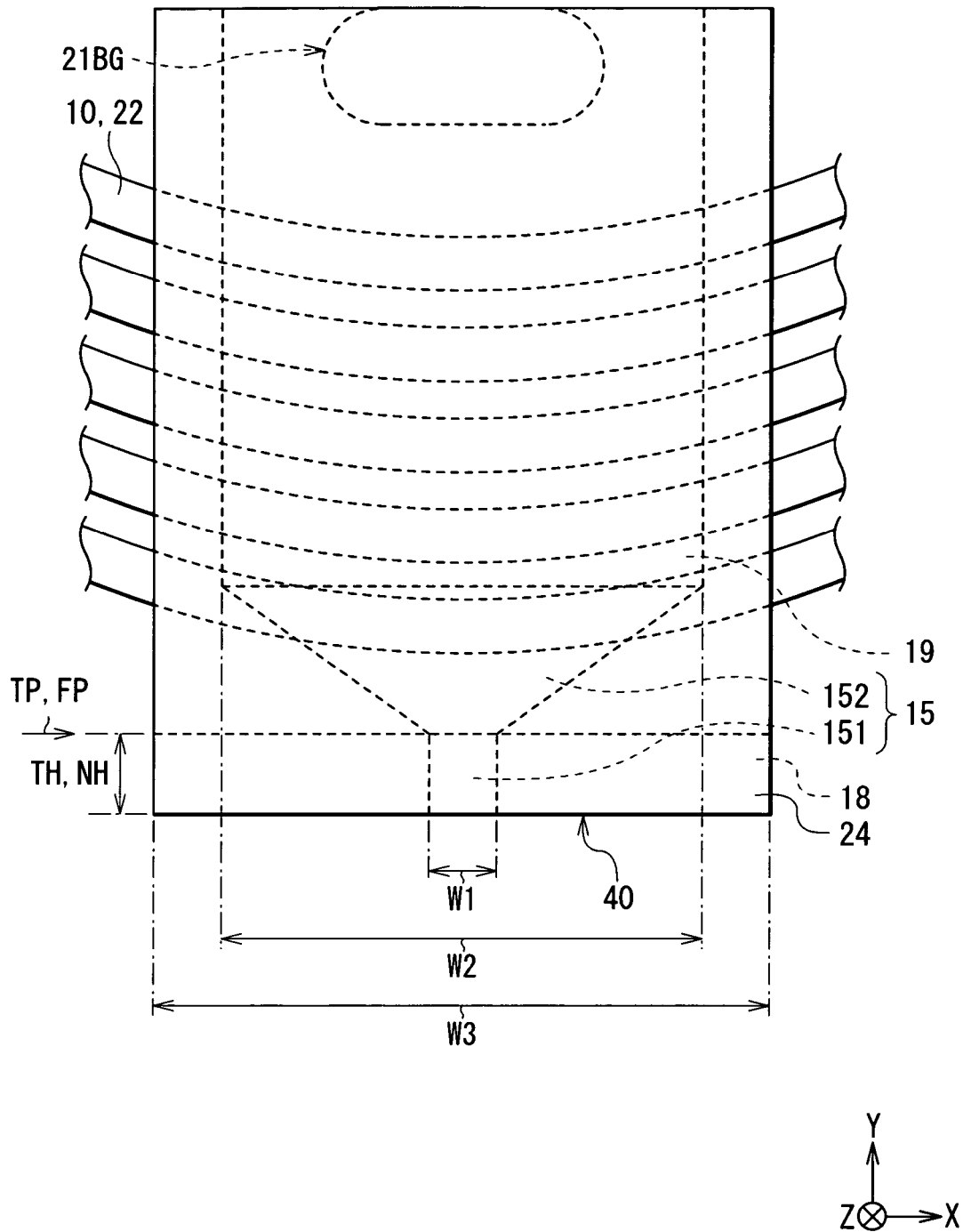
FIG. 2 is a plan view showing the plan configuration of main parts of the thin film magnetic head indicated in FIGS. 1A and 1B.
Figure 3:
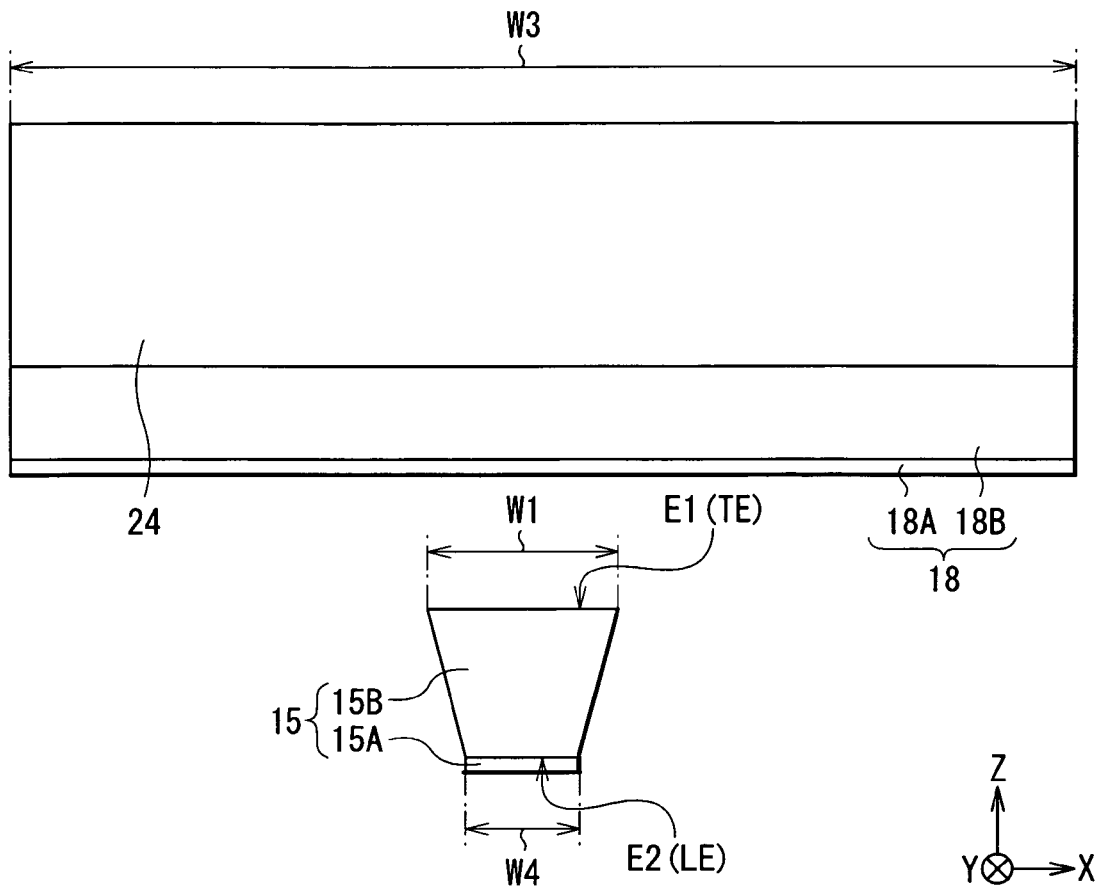
FIG. 3 is an enlarged plan view showing the plan configuration of an exposed surface on an air bearing surface of the main parts of the thin film magnetic head indicated in FIGS. 1A and 1B.
Figure 4:
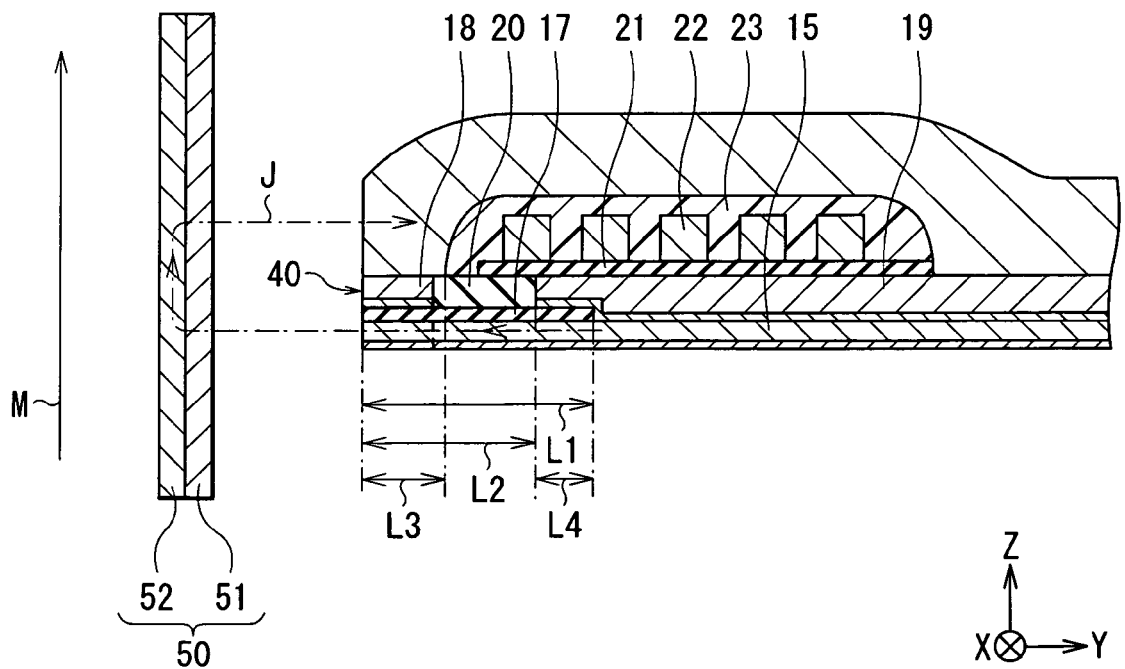
FIG. 4 is a cross sectional view schematically showing the cross sectional configuration of the main parts of the thin film magnetic head indicated in FIGS. 1A and 1B.

With reference to FIGS. 1A and 1B to 4, the configuration of a thin film magnetic head including a perpendicular magnetic write head according to an embodiment of the present invention will be described. FIGS. 1A and 1B to 4 show the configuration of the thin film magnetic head, FIGS. 1A and 1B indicating the overall cross sectional configuration, FIG. 2 indicating the plan configuration of main parts, FIG. 3 indicating the plan configuration of an exposed surface on an air bearing surface of the main parts, and FIG. 4 indicating the cross sectional configuration of the main parts, respectively. FIG. 1A indicates the cross sectional configuration parallel to the air bearing surface and FIG. 1B indicates the cross sectional configuration perpendicular to the air bearing surface. FIG. 4 indicates the main parts of the thin film magnetic head together with a recording medium 50. The upward arrows M in FIGS. 1A, 1B and 4 show the direction of relative motion of the recording medium 50 with respect to the thin film magnetic head (the medium traveling direction).

In the below description, the dimension in the X-axis direction (a write track width direction) shown in FIGS. 1A and 1B to 4 is referred to as a "width", the dimension in the Y-axis direction is referred to as a "length", and the dimension in the Z-axis direction is referred to as a "thickness", respectively. The side close to the air bearing surface in the Y-axis direction is referred to as "front" and the opposite side is referred to as "rear", respectively. The same are true for FIGS. 5A and 5B to 15A and 15B.

This thin film magnetic head is, for example, equipped on a magnetic write device such as a hard disk drive in order to perform the magnetic operation on a recording medium 50 such as a hard disk. The thin film magnetic head is a composite type head capable of both the writing process and read process as the magnetic operation. Specifically, as shown in FIGS. 1A and 1B, the thin film magnetic head has a configuration that, on a substrate 1 composed of ceramic material such as AlTiC ($Al_2O_3.TiC$), an insulating layer 2 composed of non-magnetic insulating material such as aluminum oxide ($Al_2O_3$; referred to as "alumina", hereinafter), a read head portion 100A performing the read process using magnetoresistive (MR) effect, a separating layer 9 composed of non-magnetic insulating material such as alumina, a write head portion 100B performing the writing process of the perpendicular writing method, and an overcoat layer 25 composed of non-magnetic insulating material such as alumina are stacked in this order.

The read head portion 100A has a configuration that a lower read shield layer 3, a shield gap film 4, and an upper read shield layer 30 are stacked in this order. In the shield gap film 4, an MR element 8 as a read element is buried in a manner that one end surface thereof is exposed on the air bearing surface 40 which is opposed to the recording medium 50.

Each of the lower read shield layer 3 and the upper read shield layer 30 magnetically separates the MR element 8 from its periphery, and extends backward from the air bearing surface 40. The lower read shield layer 3 is, for example, composed of magnetic material such as nickel-iron alloy (NiFe, for example, Ni: 80 weight % and Fe: 20 weight %; hereinafter, referred to as "permalloy" (product name)). The thickness of the lower read shield layer 3 is approximately from 1.0 µm to 2.0 µm. The upper read shield layer 30 has, for example, a stacked configuration that a non-magnetic layer 6 is sandwiched by two upper read shield layer portions 5 and 7. Both of the upper read shield layer portions 5 and 7 are, for example, composed of magnetic material such as permalloy. The thickness of the upper read shield layer portion 5 is approximately 1.5 µm and the thickness of the upper read shield layer portion 7 is approximately 1.1 µm, respectively. The non-magnetic layer 6 is, for example, composed of non-magnetic material such as ruthenium (Ru) and alumina, and has a thickness of approximately 0.2 µm. In addition, the upper read shield layer 30 does not necessarily have the stacked configuration, but may have a single-layer structure.

The shield gap film 4 electrically separates the MR element 8 from its periphery, and is composed of non-magnetic insulating material such as alumina.

The MR element 8 performs the read process using, for example, giant magnetoresistive (GMR) effect and tunneling magnetoresistive (TMR) effect.

The write head portion 100B is, for example, the perpendicular magnetic write head or a so-called shield type head having a configuration that a thin film coil 10 as a first coil embedded in the insulating layers 11 to 13, a non-magnetic layer 14, a main magnetic pole layer 15 whose periphery is embedded in an insulating layer 16, a gap layer 17, a write shield layer 18, an auxiliary magnetic pole layer 19 and an insulating layer 20, a thin film coil 22 as a second coil enclosed by insulating layers 21 and 23, and a return yoke layer 24 are stacked in this order. In FIGS. 2 to 4, only the main parts of the write head portion 100B are indicated.

The thin film coil 10 generates the magnetic flux for suppressing leakage in order to prevent the leakage of the magnetic flux for writing which is generated in the thin film coil 22. The thin film coil 10 is, for example, composed of high conductive material such as copper (Cu). Its thickness is approximately 2.0 µm. As shown in FIGS. 1A, 1B and 2, the thin film coil 10 has a winding structure (spiral structure) winding about a back gap 21BG. A number of turns of the thin film coil 10 can be arbitrarily set, but it preferably corresponds to the number of turns of the thin film coil 22.

The insulating layers 11 to 13 electrically separate the thin film coil 10 from its periphery. The insulating layer 11 is disposed in each of the windings of the thin coil 10 and in its periphery. The insulating layer 11 is, for example, composed of non-magnetic insulating material such as photoresist and spin on glass (SOG) showing fluidity by being heated, and has a thickness of approximately 2.0 µm. The insulating layer 12 is, for example, disposed in the periphery of the insulating layer 11. The insulating layer 12 is, for example, composed of non-magnetic material such as alumina and has a thickness of approximately 2.0 µm. The insulating layer 13 is disposed so as to cover the thin film coil 10 and the insulating layers 11 and 12. The insulating layer 13 is, for example, composed of non-magnetic insulating material which is same as that of the insulating layer 12, and has a thickness of approximately 0.2 µm.

The non-magnetic layer 14 is, for example, composed of non-magnetic insulating material such as alumina and non-magnetic conductive material such as ruthenium, and has a thickness of approximately 1.0 µm.

The main magnetic pole layer 15 has a function as a releasing portion of the main magnetic flux. That is, the main magnetic pole layer 15 accommodates the magnetic flux for writing generated in the thin film coil 22, and performs the writing process by leading the magnetic flux to the recording medium 50. The main magnetic pole layer 15 extends from the air bearing surface 40 to the back gap 21BG, and has a thickness of approximately 0.25 µm. The main magnetic pole layer 15 is, for example, composed of magnetic material having saturation magnetic flux density higher than that of the auxiliary magnetic pole layer 19. As this type of magnetic material, for example, iron (Fe), rich iron-nickel alloy (FeNi), iron-cobalt alloy (FeCo), and iron-cobalt-nickel alloy (FeCoNi) are given.

As shown in FIG. 2, the main magnetic pole layer 15 has, for example, a tip portion 151 having a uniform width W1 which defines the write track width of the recording medium 50, and a rear end portion 152 connected to the rear of the tip portion 151 and having a width W2 larger than the width W1. The tip portion 151 substantially releases the magnetic flux to the recording medium 50. The rear end portion 152 accommodates the magnetic flux from the auxiliary magnetic pole layer 19, and supplies the flux to the tip portion 151. The width of the rear end portion 152 is, for example, uniform (the width 2) in the rear, and is gradually decreased in front toward the tip portion 151. The position where the width of the main magnetic pole layer 15 starts to be increased from the tip portion 151 toward the rear end portion 152 is a so-called flare point FP. The distance between the air bearing surface 40 and the flare point FP is called a neck height NH.

In particular, the main magnetic pole layer 15 is, for example, formed using plating method, and has a configuration that a seed layer 15A, and a plating layer 15B deposited on the seed layer 15A are stacked in this order. The plating layer 15B has the exposed surface on the air bearing surface 40, and the exposed surface has, for example, an inverted-trapezoid shape as shown in FIG. 3. That is, the exposed surface is defined by an upper edge E1 (namely, a trailing edge TE) which is located on a trailing side and has the width W1, and a lower edge E2 (namely, a leading edge LE) which is located on a leading side and has a width W4 smaller than the width W1. The exposed surface has an inverted-trapezoid shaped configuration with one of these edges at the top (the longer side) and the other at the bottom (the shorter side). The trailing edge TE is substantially a writing point of the main magnetic pole layer 15, and the width W1 is approximately 0.2 µm or below.

Here, as shown in FIGS. 1A and 1B to 4, when a travel of the recording medium 50 traveling in the medium traveling direction M is seen as a flow, the term "trailing side" means the outflow side of the flow (the medium traveling direction M side), corresponding to the upper side in the thickness direction (the Z-axis direction). On the other hand, the term "leading side" means the inflow side of the flow (the opposite of the medium traveling direction M side), corresponding to the lower side in the thickness direction.

The insulating layer 16 electrically separates the main magnetic pole layer 15 from its periphery. The insulating layer 16 is, for example, composed of non-magnetic insulating material such as alumina, and has a thickness of approximately 0.25 µm.

The gap layer 17 magnetically separates the main magnetic pole layer 15 and the write shield layer 18. The gap layer 17 extends backward from the air bearing surface 40 while being located adjacent to the main magnetic pole layer 15 on the trailing side thereof. However, the gap layer 17 ends in the position between the air bearing surface 40 and back gap 21 BG, and the rear edge of the gap layer 17 is located backward from the front edge of the auxiliary magnetic pole layer 19. The gap layer 17 is, for example, composed of non-magnetic insulating material such as alumina, and non-magnetic conductive material such as ruthenium, and has a thickness of approximately from 0.01 µm to 0.1 µm.

The auxiliary magnetic pole layer 19 has a function as an accommodation portion of the main magnetic flux. The auxiliary magnetic pole layer 19 extends backward from the position recessed from the air bearing surface 40 on the trailing side of the main magnetic pole layer 15, to the back gap 21BG, and has a thickness of approximately 0.45 µm. As described above, because the rear edge of the gap layer 17 is recessed from the front edge of the auxiliary magnetic pole layer 19, the auxiliary magnetic pole layer 19 is partially overlapped on the gap layer 17. The auxiliary magnetic pole layer 19 is, for example, composed of iron-cobalt-nickel alloy, or the like. The auxiliary magnetic pole layer 19 is, for example, planarized together with the write shield layer 18 and the insulating layer 20 as shown in FIGS. 1A and 1B; thereby a planarized surface HM is composed. That is, the planes on the trailing side of the auxiliary magnetic pole layer 19, the write shield layer 18 and the insulating layer 20 are on the same plane level. The "same plane" is a so-called imaginary plane (X-Y plane).

As shown in FIG. 2, the auxiliary magnetic pole layer 19 has, for example, a plan configuration of a rectangular shape having the width W2. The auxiliary magnetic pole layer 19 is formed using plating method in the same way as forming the main magnetic pole layer 15, and has a configuration that the seed layer 19A and the plating layer 19B are stacked in this order. In particular, the front edge of the auxiliary magnetic pole layer 19 is located backward from the front edge of the insulating layer 23.

The insulating layer 20 is a first insulating layer defining the throat height TH. The insulating layer 20 fills a region between the auxiliary magnetic pole layer 19 and the write shield layer 18, and defines the throat height zero position TP in the position adjacent to the write shield layer 18. The throat height TH is a distance between the air baring surface 40 and the throat height zero position TP. The insulating layer 20 is, for example, composed of non-magnetic insulating material such as alumina. In FIGS. 1A, 1B and 2, for example, the case is shown where the throat height zero position TP corresponds to the flare point FP.

The insulating layers 21 and 23 electrically separate the thin film coil 22 from its periphery. The insulating layer 21 is disposed as a base of the thin film coil 22 on the planarized plane HM. The insulating layer 21 is, for example, composed of the non-magnetic insulating material which is same as those of the insulating layers 12 and 13, and has a thickness of approximately 0.2 µm. The insulating layer 23 is disposed on the trailing side of the insulating layer 21, and is a second insulating layer covering the thin film coil 22. The insulating layer 23 is, for example, composed of non-magnetic insulating material which is same as that of the insulating layer 11, and the vicinities of the edges of the insulating layer 23 are roundly inclined down toward the edges. In particular, the position of the front edge of the insulating layer 20 fundamentally defines the throat height zero position TP; thereby the front edge of the insulating layer 23 is located backward from the front edge of the insulating layer 20.

The thin film coil 22 generates the magnetic flux for writing. In the thin film coil 22, for example, the current flows in the opposite direction of the current flowing in the thin film coil 10. The material, thickness and three-dimensional configuration regarding the tin film coil 22 except the foregoing are, for example, the same as those of the thin film coil 10.

The return yoke layer 24 absorbs the magnetic flux after writing (the magnetic flux used for the writing process in the recording medium 50) so that the magnetic flux is circulated between the write head portion 100B and the recording medium 50. The return yoke layer 24 extends backward from the air bearing surface 40 on the trailing side of the gap layer 17 and the auxiliary magnetic pole layer 19, to the back gap 21BG. The return yoke layer 24 is coupled to the write shield layer 18 on the side close to the air bearing surface 40, and coupled to the auxiliary magnetic pole layer 19 on the side away from the air bearing surface 40. The return yoke layer 24 is, for example, composed of magnetic material having high saturation magnetic flux density such as parmalloy and iron-based alloy. As shown in FIG. 2, the return yoke layer 24 has, for example, a plan configuration of a rectangular shape having a width W3 larger than the width W2 of the main magnetic pole layer 15 and the auxiliary magnetic pole layer 19. As shown in FIG. 3, the return yoke layer 24 has the exposed surface of a rectangular shape on the air bearing surface 40.

The write shield layer 18 absorbs the spread component of the magnetic flux released from the main magnetic pole layer 15 in order to: (1) increase the magnetic field slope of the perpendicular magnetic field; (2) decrease a recording width; and (3) include the tilted magnetic field component in the perpendicular magnetic field. However, the write shield layer 18 may have a function to circulate the magnetic flux in the same way as the return yoke layer 24. The write shield layer 18 is located in the region close to the air bearing surface 40 between the gap layer 17 and the return yoke layer 24, and is included in the layer level defined by the auxiliary magnetic pole layer 19. The write shield layer 18 extends from the air bearing surface 40 to a position forward of the auxiliary magnetic pole layer 19. The write shield layer 18 is, for example, composed of magnetic material which is same as that of the return yoke layer 24. In particular, because the write shield layer 18 is located adjacent to the insulating layer 20, the write shield layer 18 substantially has a function to define the throat height TH by defining the position of the front edge of the insulating layer 20 (the throat height zero position TP).

As shown in FIGS. 2 and 3, for example, the write shield layer 18 has a plan configuration of a rectangular shape with the width W3 in the same way as the return yoke layer 24, and has the exposed surface of a rectangular shape on the air bearing surface 40. The write shield layer 18 is, for example, formed using plating method in the same way as the main magnetic pole layer 15, and has a configuration that the seed layer 18A and the plating layer 18B are stacked in this order.

For example as shown in FIG. 4, each of the dimensions in the thin film magnetic head is optimally defined to maintain the writing performance. Specifically, as described above, because the rear edge of the gap layer 17 is located backward from the front edge of the auxiliary magnetic pole layer 19, a length L1 from the air bearing surface 40 of the gap layer 17 is larger than a recessing length L2 from the air bearing surface 40 of the auxiliary magnetic pole layer 19. In this case, in order to suppress the magnetic flux in the auxiliary magnetic pole layer 19 being released too much to the return yoke layer 24 rather than to the main magnetic pole layer 15, the front edge of the auxiliary magnetic pole layer 19 is located backward from the front edge of the insulating layer 23. Thus, the recessing length L2 is larger than a recessing length L3 which is the distance from the air bearing surface 40 of the insulating layer 23. The overlapping length L4 between the gap layer 17 and the auxiliary magnetic pole layer 19 can be set arbitrarily.

In particular, the recessing length L2 influences the intensity of the perpendicular magnetic field and the occurrence of the pole erasure. In order to maintain the intensity of the perpendicular magnetic field while suppressing the pole erasure, the recessing length L2 is set preferably from 0.6 µm to 3.0 µm and more preferably from 0.8 µm to 3.0 µm. In this case, further, the recessing length L2 is set preferably from 0.6 µm to 2.7 µm and more preferably from 0.8 µm to 2.7 µm for the better effects.

As shown in FIG. 4, the recording medium 50 has, for example, a stacked configuration including a magnetization layer 51 and a soft magnetic layer 52. The magnetization layer 51 is disposed in opposition to the air bearing surface 40 with respect to the thin film magnetic head. Information is magnetically recorded on the magnetization layer 51. The soft magnetic layer 52 has a function as a flux path of the magnetic flux for writing. The recording medium 50 including the magnetization layer 51 and the soft magnetic layer 52 is generally referred to as a "double-layer recording medium" for perpendicular writing.

Successively, with reference to FIGS. 1A and 1B to 4, operation of the thin film magnetic head will be described.

In the thin film magnetic head, when the current flows in the thin film coil 22 of the write head portion 100B from an external circuit (not shown in the figure) in data writing mode, a magnetic flux J for writing is generated. The magnetic flux J is mainly accommodated in the main magnetic pole layer 15 and then flows into the tip portion 151 through the inside of the main magnetic pole layer 15. A part of the magnetic flux J is accommodated in the auxiliary magnetic pole layer 19, and then flows into the main magnetic pole layer 15 through the auxiliary magnetic pole layer 19. At this time, the magnetic flux J flowing inside of the main magnetic pole layer 15 is focused by being gathered on the flare point FP. Finally, it is concentrated on the vicinity of the trailing edge TE on the air bearing surface 40. The magnetic flux J is externally released so that the perpendicular magnetic field is generated;

thereby the magnetization layer 51 is magnetized. Therefore, the information is magnetically recorded on the recording medium 50.

In this case, the current flows in the opposite direction each other in the thin film coils 10 and 22; thereby the magnetic flux in the opposite direction each other is generated in the thin film coils 10 and 22. With reference to FIGS. 1A and 1B, specifically, the magnetic flux for suppressing leakage is generated upward in the thin film coil 10, but the magnetic flux for writing is generated downward in the thin film coil 22. Thus, due to the influence of the magnetic flux for suppressing leakage, the magnetic flux for writing hardly flows from the write head portion 100B to the read head portion 100A; thereby the leakage of the magnetic flux for writing is suppressed.

When the magnetic flux J is released from the main magnetic pole layer 15, the spread component of the magnetic flux J is absorbed in the write shield layer 18 so that the magnetic field slope of the perpendicular magnetic field is increased. The magnetic flux J absorbed in the write shield layer 18 is resupplied to the main magnetic pole layer 15 through the auxiliary magnetic pole layer 19 in the back gap 21 BG.

During data writing mode, when the magnetic flux J is released from the main magnetic pole layer 15 to the recording medium 50, the magnetic flux J magnetizes the magnetization layer 51 and then is absorbed in the return yoke layer 24 through the soft magnetic layer 52. At this time, a part of the magnetic flux J is absorbed in the write shield layer 18. These magnetic fluxes J are also resupplied in the main magnetic pole layer 15. Thus, the magnetic flux J is circulated between the write head portion 100B and the recording medium 50; thereby the magnetic circuit is constructed.

On the other hand, in data reading mode, when the sense current flows in the MR element 8 of the read head portion 100A, the resistance value of the MR element 8 is changed according to the signal magnetic field for reading from the recording medium 50. Thus, the resistance change of the MR element 8 is detected as a change of the sense current; thereby the information recorded in the recording medium 50 is magnetically read.

Successively, with reference to FIGS. 1A and 1B to 8A and 8B, a method of manufacturing the thin film magnetic head mentioned above will be described. FIGS. 5A and 5B to 8A and 8B illustrate a process of manufacturing the thin film magnetic head, each of them indicating the cross sectional configuration in correspondence with FIGS. 1A and 1B.

With reference to FIGS. 1A and 1B, an outline of the process of manufacturing the entire thin film magnetic head will be described. Then, with reference to FIGS. 1A and 1B to 8A and 8B, the process of forming the main parts of the write head portion 100B will be described in detail while applying the method of manufacturing the perpendicular magnetic write head of the present invention. The material, dimensions and structural features of the series of the components of the thin film magnetic head have been already described in detail; thereby these descriptions will be appropriately omitted.

The thin film magnetic head is manufactured mainly using the existing thin film process including film-deposition technique represented by plating method and sputtering method, patterning technique represented by photolithography method, etching technique represented by dry etching method and wet etching method, and planarization technique represented by polishing method. The thin film magnetic head is manufactured by forming the series of components in order and stacking them. That is, as shown in FIGS. 1A and 1B, when manufacturing the thin film magnetic head, the read head portion 100A is formed in the following way. The insulating layer 2 is formed on the substrate 1. The lower read shield layer 3, the shield gap film 4 where the MR element 8 is buried, and the upper read shield layer 30 are stacked in this order on the insulating layer 2. Successively, the write head portion 100B is formed in the following way. The separating layer 9 is formed on the read head portion 10A. Then the thin film coil 10 embedded by the insulating layers 11 to 13, the non-magnetic layer 14, the main magnetic pole layer 15 whose periphery is embedded by the insulating layer 16, the gap layer 17, the write shield layer 18, the auxiliary magnetic pole layer 19, the insulating layer 20, the thin film coil 22 embedded by the insulating layers 21 and 23, and the return yoke layer 24 are stacked in this order on the separating layer 9. Finally, the overcoat layer 25 is formed on the write head portion 100B, and the air bearing surface 40 is formed as one end face of the thin film magnetic head; thereby the thin film magnetic head is completed.

Figure 5B:
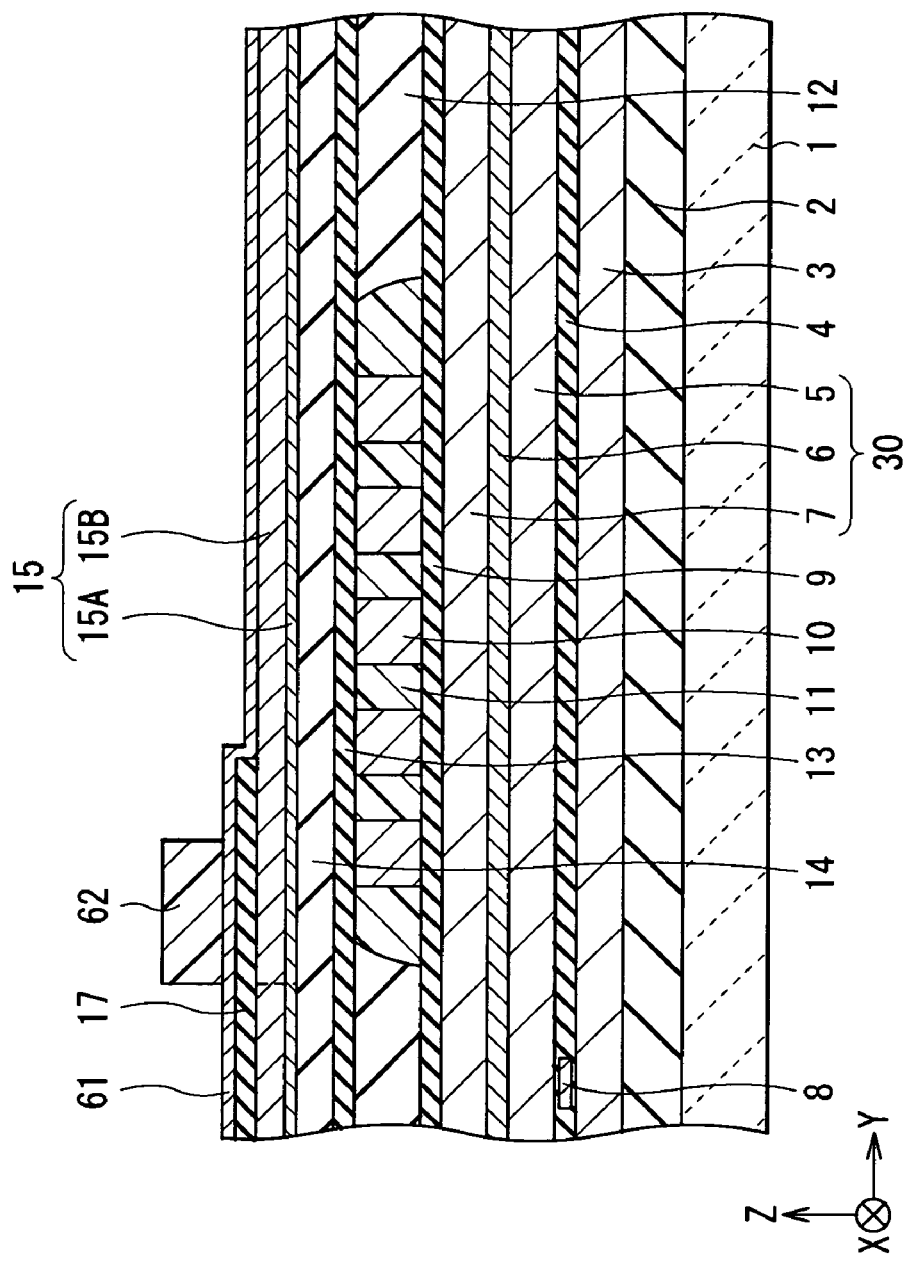
FIGS. 5A and 5B are cross sectional views illustrating a step in a method of manufacturing the thin film magnetic head according to an embodiment of the present invention.
Figure 5A:
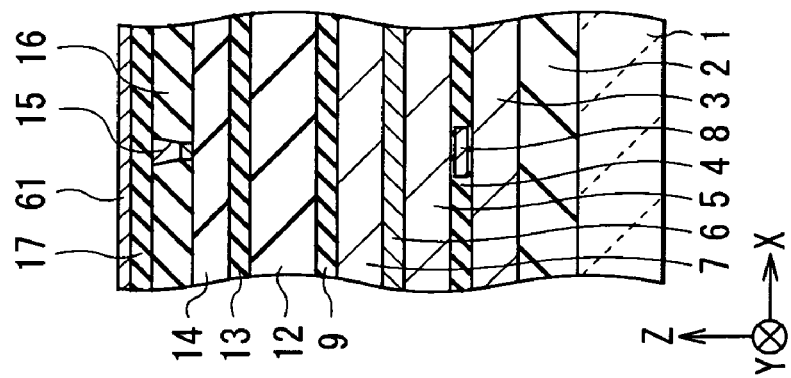

When forming the main magnetic pole layer 15, the gap layer 17 and the auxiliary magnetic pole layer 19 as the main parts of the write head portion 100B, the non-magnetic layer 14 is formed. Then, as shown in FIGS. 5A and 5B, the main magnetic pole layer 15 is formed on the non-magnetic layer 14 using plating method. The insulating layer 16 is formed to fill the periphery of the main magnetic pole layer 15. When forming the main magnetic pole layer 15, for example, a plating film is deposited on the seed layer 15A so that the plating layer 15B is formed. When the insulating layer 16 enclosing the periphery of the main magnetic pole layer 15 is formed, the main magnetic pole layer 15 and the insulating layer 16 may be optionally planarized using chemical mechanical polishing (CMP) or the like. Steps of forming the main magnetic pole layer 15 using plating method will be described in detail in the process of forming the auxiliary magnetic pole layer 19 of the post process.

Successively, the gap layer 17 is formed on the main magnetic pole layer 15. The gap layer 17 extends backward from the air bearing surface 40. Here, the term "air bearing surface 40" means the position where the air bearing surface 40 will be formed, because the air bearing surface 40 has not been formed yet at this point in forming the main magnetic pole portion 15. The same will be applied, hereinafter. When forming the gap layer 17, for example, the non-magnetic insulating material is film-deposited so as to cover the main magnetic pole layer 15 using sputtering method and then etching may be performed. Or a combination of sputtering method and lift-off method may be used to selectively film-deposit the non-magnetic insulating material on the main magnetic pole layer 15. As the non-magnetic insulating material, material having an etching rate slower than that of a seed layer 61 is used so that the gap layer 17 can have a function as an etching stopper layer in the etching process (refer to FIGS. 7A and 7B) of the seed layer 61 which will be described later.

Successively, using sputtering method, the seed layer 61 to deposit a plating film is formed so as to cover the main magnetic pole layer 15 and the gap layer 17. The seed layer 61 is used in the post process to form, by plating method, the write shield layer 18 and the auxiliary magnetic pole layer 19 parallel to each other.

Successively, on the seed layer 61, a mask 62 is selectively formed to selectively deposit the plating film. When forming the mask 62, for example, photoresist is applied on the surface of the seed layer 61 so as to form a photoresist film, and then the photoresist film is selectively exposed and developed using photolithography method. In particular, in this case, the mask 62 is aligned in a position so that the mask 62 is disposed in the region except the region where the write shield layer 18 and the auxiliary magnetic pole layer 19 are formed.

Figure 6B:
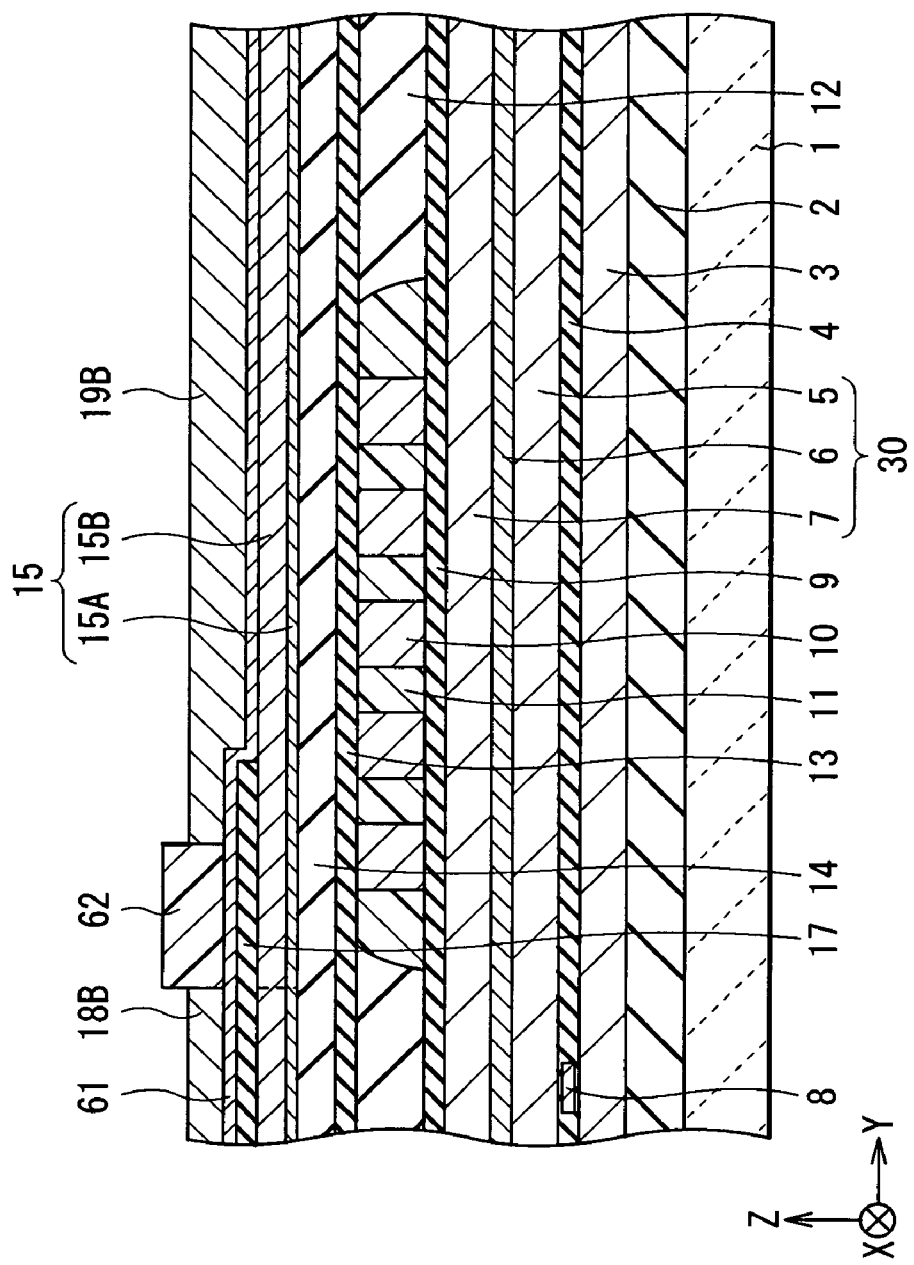
FIGS. 6A and 6B are cross sectional views illustrating a step following FIGS. 5A and 5B.
Figure 6A:
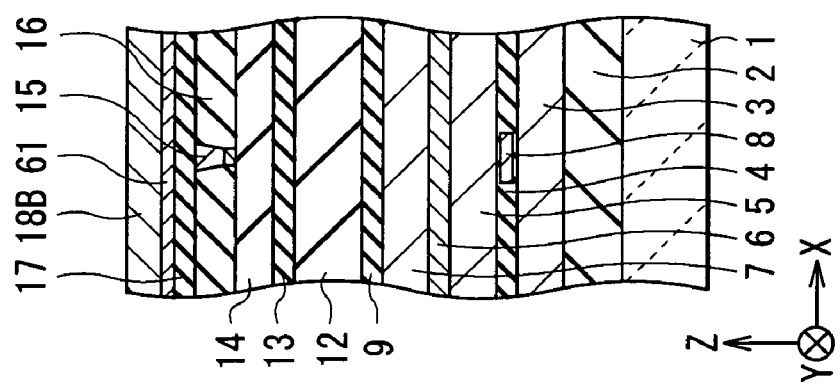

Successively, using the mask 62, a plating film is selectively deposited on the seed layer 61. As shown in FIGS. 6A and 6B, the plating layer 18B is formed in the region close to the air bearing surface 40, and the plating layer 19B is formed in the region away from the air bearing surface 40. In this case, the plating layer 18B is entirely stacked on the gap layer 17 with the seed layer 61 in between, and the plating layer 19B is partially overlapped on the gap layer 17 with the seed layer 61 in between.

Figures 7A, 7B:
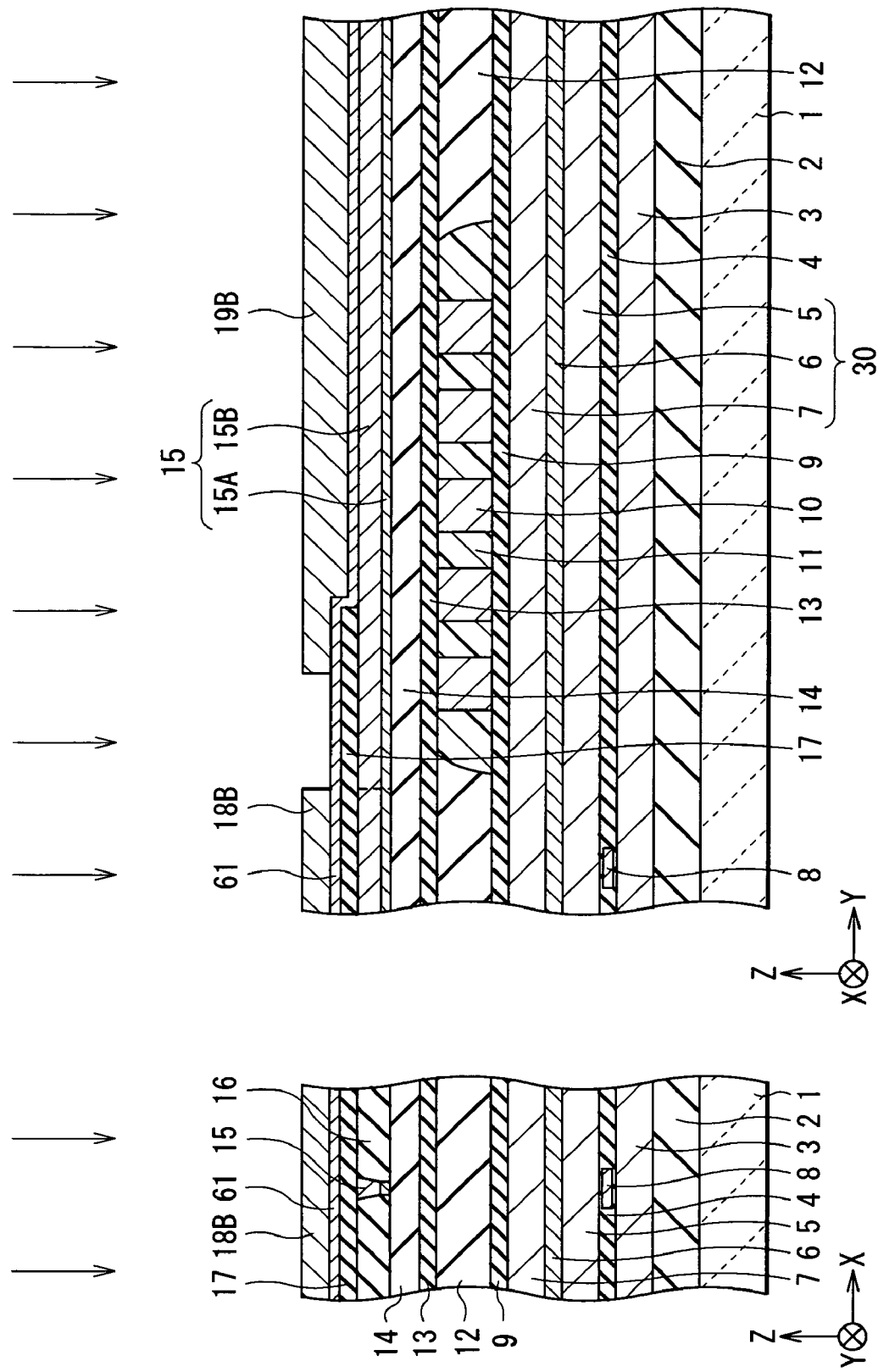
FIGS. 7A and 7B are cross sectional views illustrating a step following FIGS. 6A and 6B.

Successively, the mask 62 is removed to partially expose the seed layer 61. As shown in FIGS. 7A and 7B, by ion milling method or the like, the seed layer 61 is selectively subjected to etching using the plating layers 18B and 19B as the masks.

Figure 8B:
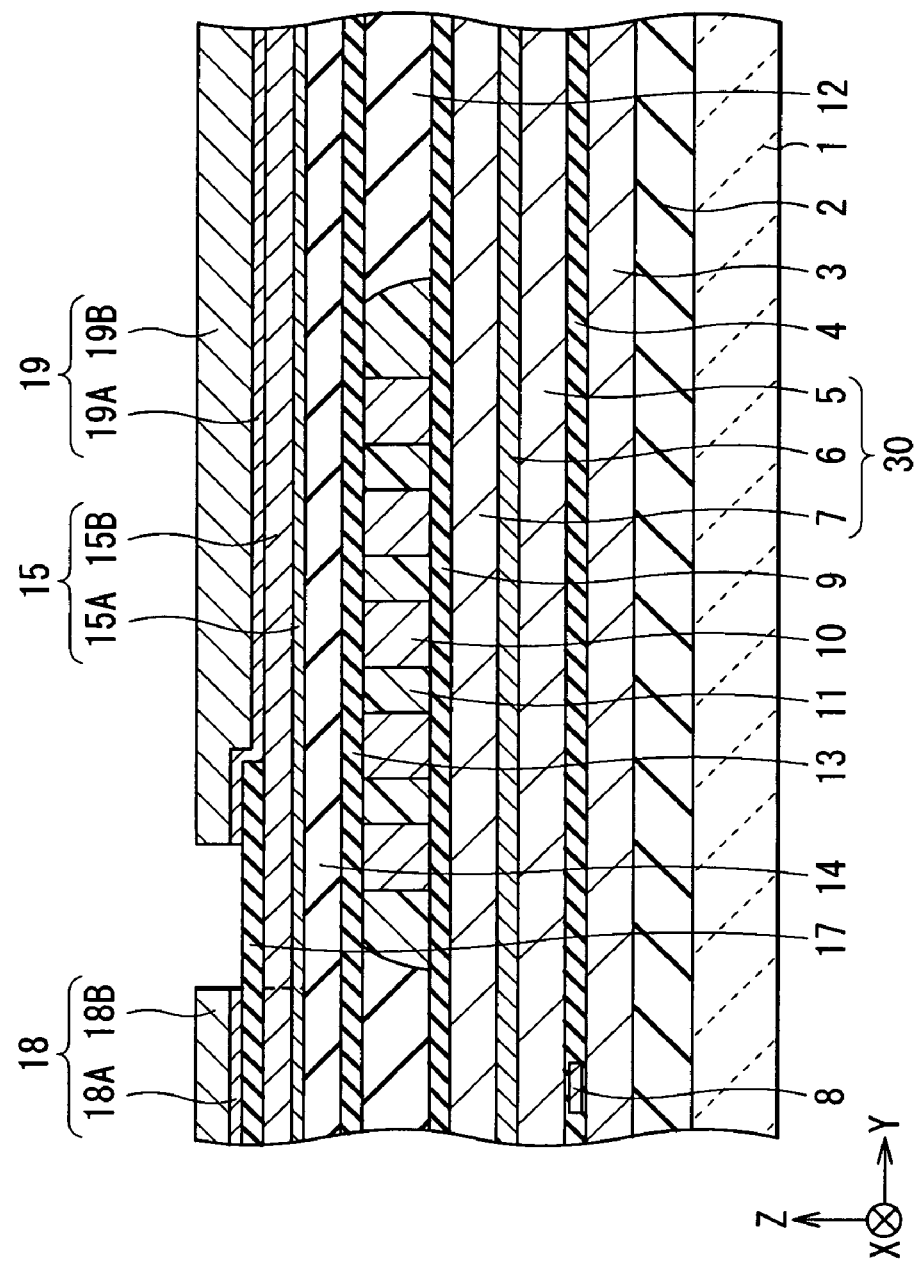
FIGS. 8A and 8B are cross sectional views illustrating a step following FIGS. 7A and 7B.
Figure 8A:
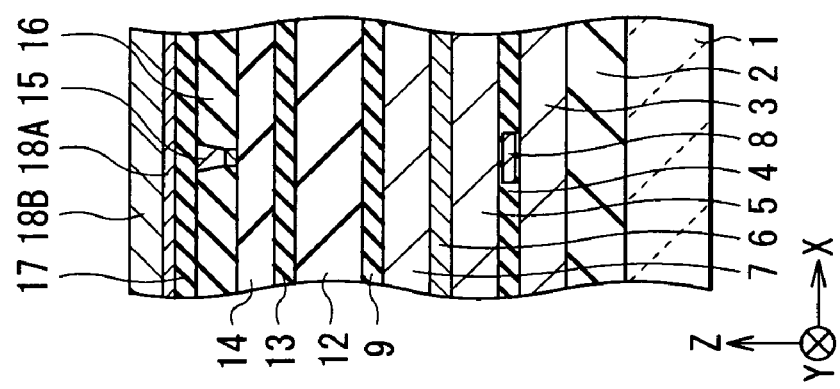

By the etching, the exposed portion of the seed layer 61 is removed. As shown in FIGS. 8A and 8B, the seed layer 18A as the remaining portion of the seed layer 61 is formed under the plating layer 18B, and the seed layer 19A as the other remaining portion of the seed layer 61 is formed under the plating layer 19B. In this case, overetching may be optionally performed in order to completely remove the exposed portion of the seed layer 61. In FIGS. 8A and 8B, the case is shown where the gap layer 17 is not subjected to etching at all. However, the gap layer 17 may be subjected to etching according to the extent of the overetching. Accordingly, the write shield layer 18 including the seed layer 18A and the plating layer 18B is formed, and the auxiliary magnetic pole layer 19 including the seed layer 19A and the plating layer 19B is formed.

In the above, it is described that the main magnetic pole layer 15 is completed at the time shown in FIGS. 5A and 5B in order to simplify the description. However, strictly, the main magnetic pole layer 15 is substantially completed by forming the air bearing surface 40 in the post process as shown in FIGS. 1A and 1B. Needless to say, the same is true for the write shield layer 18.

In the thin film magnetic head and the method of manufacturing the same according to the present embodiment, the auxiliary magnetic pole layer 19 is disposed on the trailing side of the main magnetic pole layer 15, and the write shield layer 18 is also disposed on the trailing side of the main magnetic pole layer 15. Thus, unlike the case where the auxiliary magnetic pole layer 19 is disposed on the leading side of the main magnetic pole layer 15, the occurrence of the pole erasure can be suppressed. The reasons are as follows. That is, in case the auxiliary magnetic pole layer 19 is disposed on the leading side of the main magnetic pole layer 15, the magnetic flux generated in the thin film coil 22 is accommodated in the auxiliary magnetic pole layer 19. A part of the magnetic flux is released externally and directly from the air bearing surface 40 without passing through the main magnetic pole layer 15 so that the unnecessary magnetic field is generated. In this case, the recording medium is remagnetized by the unnecessary magnetic field so that the pole erasure likely occurs. On the other hand, in case the auxiliary magnetic pole layer 19 is disposed on the trailing side of the main magnetic pole layer 15, even if a part of the magnetic flux accommodated in the auxiliary magnetic pole layer 19 is likely released externally and directly from the air bearing surface 40 without passing through the magnetic pole layer 15, the magnetic flux J is absorbed in the write shield layer 18. Thereby, the unnecessary magnetic field is hardly generated. The recording medium is not remagnetized by the unnecessary magnetic field; thereby the pole erasure hardly occurs. In this case, in particular, when the recessing length L2 of the auxiliary magnetic pole layer 19 is set from 0.6 µm to 3.0 µm, and more preferably from 0.8 µm to 3.0 µm, the intensity of the perpendicular magnetic field is maintained while effectively suppressing the pole erasure.

When the auxiliary magnetic pole layer 19 is disposed on the trailing side of the main magnetic pole layer 15, the extension range of the auxiliary magnetic pole layer 19 can be arbitrarily set. More specifically, with reference to FIGS. 1A and 1B, the front edge of the auxiliary magnetic pole layer 19 may be located anywhere as long as it is located between the front edge and the rear edge of the insulating layer 23. Even if the position of the front edge of the auxiliary magnetic pole layer 19 is changed between the front edge and the rear edge of the insulating layer 23, the pole erasure can be still suppressed. However, the following points are necessarily taken into account to set the position of the front edge of the auxiliary magnetic pole layer 19. That is, when the front edge of the auxiliary magnetic pole layer 19 is located too close to the front edge of the insulating layer 23, the amount of the magnetic flux absorbed in the write shield layer 18 from the auxiliary magnetic pole layer 19 is increased; thereby the intensity of the perpendicular magnetic field is likely decreased. On the other hand, when the front edge of the auxiliary magnetic pole layer 19 is located too close to the rear edge of the insulating layer 23, the amount of the accommodated magnetic flux is insufficient as the capacity of the auxiliary magnetic pole layer 19 is too small; thereby the intensity of the perpendicular magnetic filed is also likely decreased. In consideration of these points, the front edge of the auxiliary magnetic pole layer 19 is necessarily located in the position not too close to the front edge and the rear edge of the insulating layer 23 so that the intensity of the perpendicular magnetic field can be maintained while suppressing the pole erasure.

Moreover, in the present embodiment, in case the gap layer 17 extending backward from the air bearing surface 40, and the auxiliary magnetic pole layer 19 extending backward from the position recessed from the air bearing surface 40 are disposed on the trailing side of the main magnetic pole layer 15, the rear edge of the gap layer 17 is located backward from the front edge of the auxiliary magnetic pole layer 19 so that the auxiliary magnetic pole layer 19 is partially overlapped on the gap layer 17. Therefore, the high performance and stability in the writing performance can be achieved by the following reasons.

Figures 9A, 9B:
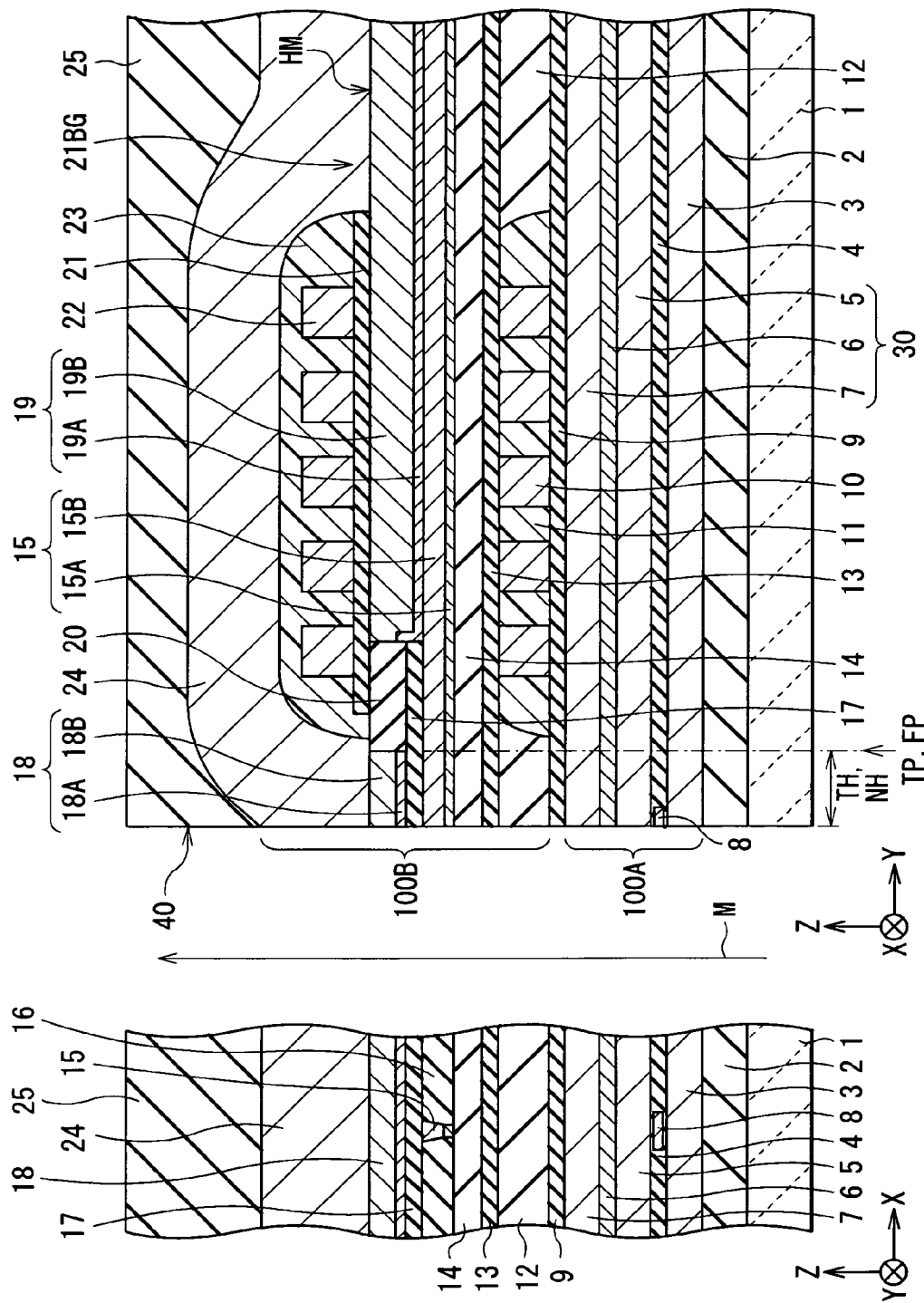
FIGS. 9A and 9B are cross sectional views showing the cross sectional configuration of the thin film magnetic head of a comparative example with respect to the thin film magnetic head according to an embodiment of the present invention.

FIGS. 9A and 9B show the configuration of a comparative example with respect to the thin film magnetic head in the embodiment, corresponding to FIGS. 1A and 1B, respectively. FIGS. 10A, 10B, 11A and 11B illustrate a manufacturing process and problems of the thin film magnetic head of the comparative example, corresponding to FIGS. 7A, 7B, 8A and 8B, respectively. In the thin film magnetic head of the comparative example, as shown in FIGS. 9A and 9B, the rear end of the gap layer 17 positionally corresponds to the front edge of the auxiliary magnetic pole layer 19. Except the point that the auxiliary magnetic pole layer 19 is not partially overlapped on the gap layer 17, the comparative example has the same configuration as the thin film magnetic head of the embodiment.

Figures 10A, 10B:
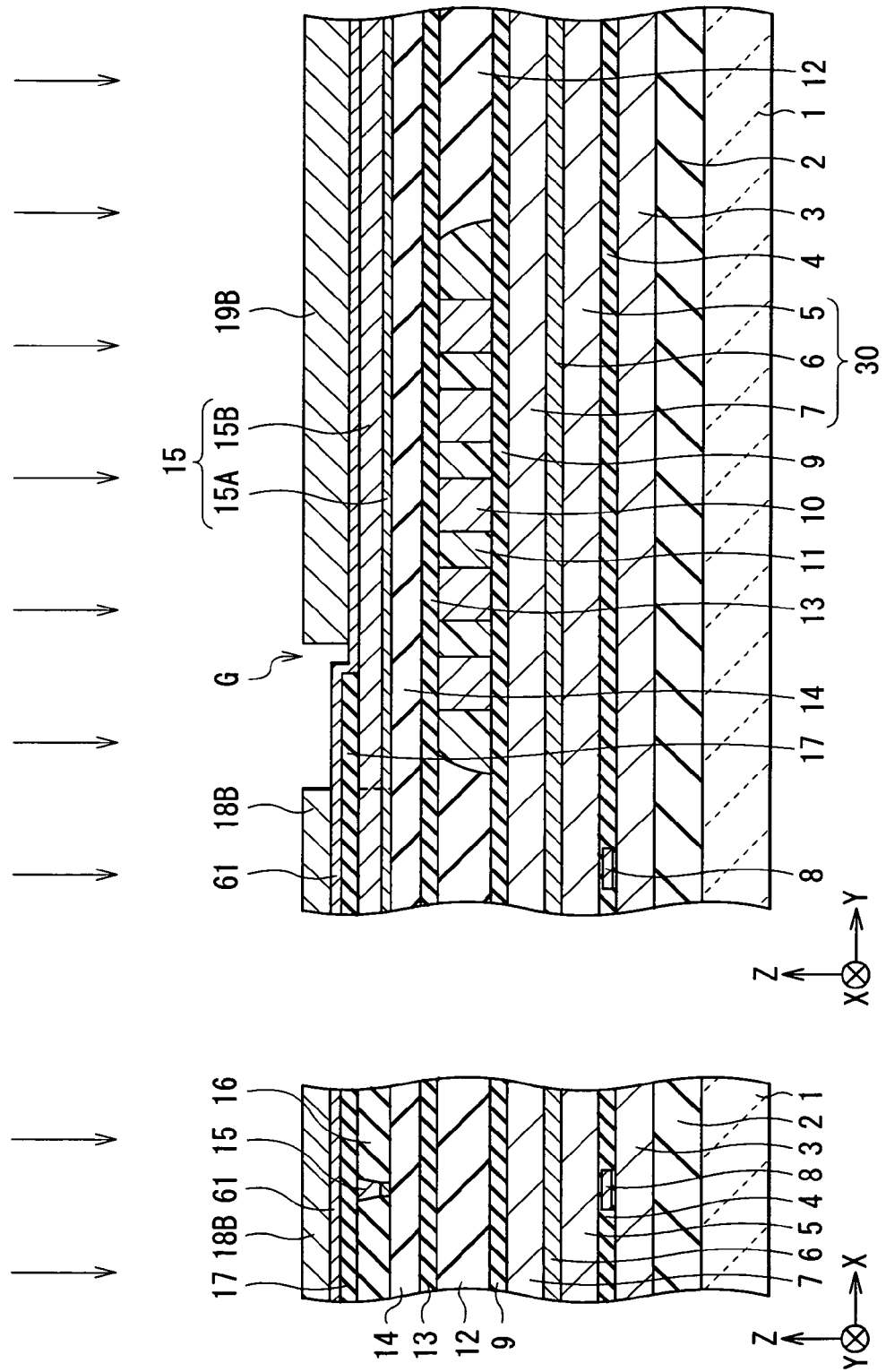
FIGS. 10A and 10B are cross sectional views illustrating a manufacturing process and problems of the thin film magnetic head of the comparative example.
Figure 11B:
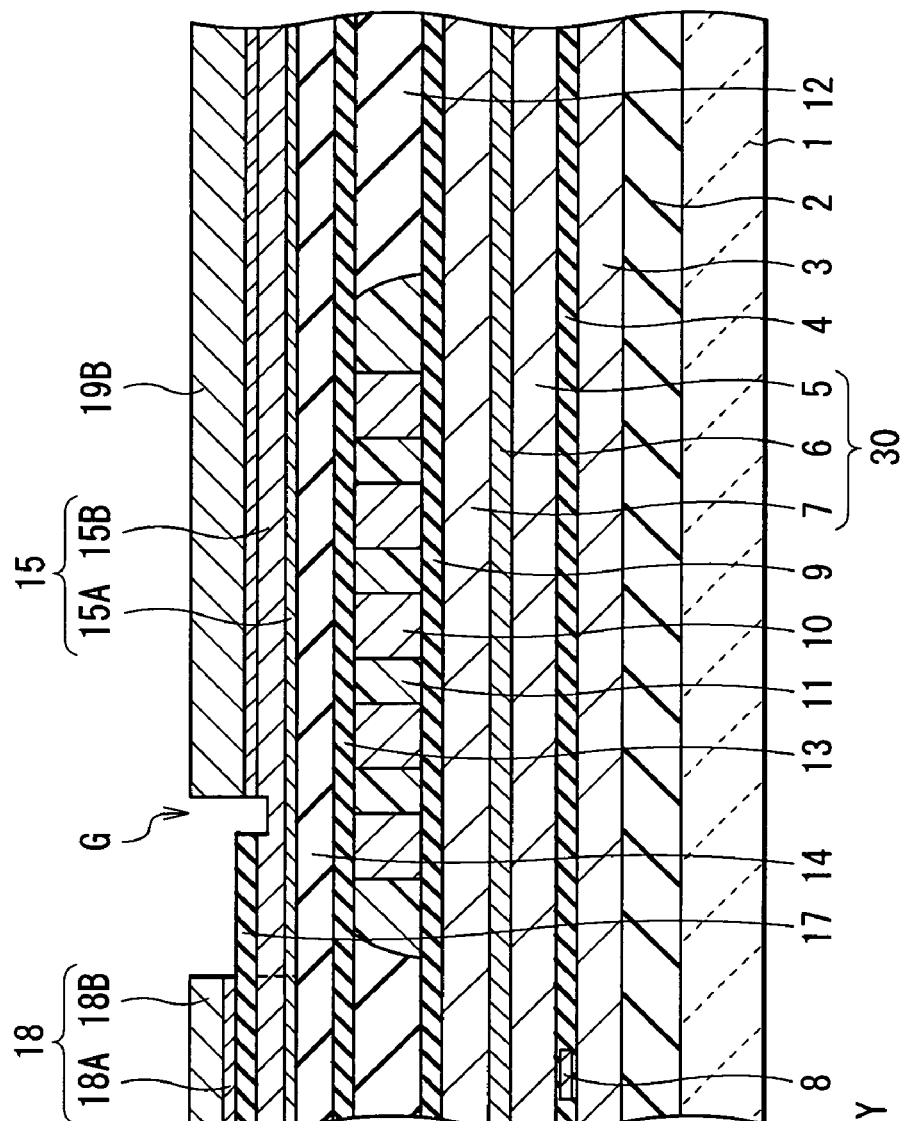
FIGS. 11A and 11B are cross sectional views illustrating a step following FIGS. 10A and 10B.
Figure 11A:
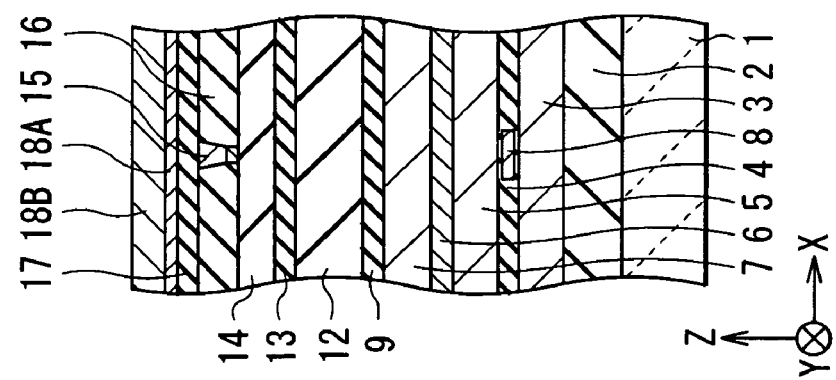

In the process of manufacturing the thin film magnetic head of the comparative example, as shown in FIGS. 10A and 10B, if the position of the auxiliary magnetic pole layer 19 is shifted due to the dimension error and position error so that the auxiliary magnetic pole layer 19 is recessed from the gap layer 17, the gap G is produced therebetween. In this case, when the seed layer 61 is subjected to etching using the plating layers 18B and 19B as the masks, as shown in FIGS. 11A and 11B, the gap layer 17 having a function as the etching stopper layer is not provided in the gap G. Thus, the already-formed main magnetic pole layer 15 is also likely subjected to etching unintentionally. The already-formed main magnetic pole layer 15 is subjected to this unintentional etching if the position of the auxiliary magnetic pole layer 19 is even slightly shifted. The amount of etching becomes remarkable in case of overetching. If the main magnetic pole layer 15 is unintentionally subjected to etching, a problem arises that its thickness is locally decreased in comparison with the designed value (so-called chalking); thereby the magnetic flux saturation likely occurs in the main magnetic pole layer 15. Therefore, the deterioration and unstability in the writing performance are caused.

On the other hand, in the process of manufacturing the thin film magnetic head in the embodiment, the overlapping length L4 (refer to FIG. 4) is set to exceed the amount of the shift in the position of the auxiliary magnetic pole layer 19 described above. As shown in FIGS. 7A and 7B, the auxiliary magnetic pole layer 19 is certainly stacked on the gap layer 17; thereby the gap G is not produced therebetween. In this case, as shown in FIGS. 8A and 8B, in the etching process of the seed layer 61, the gap layer 17 has a function as the etching stopper layer to protect the main magnetic pole layer 15. Unless overetching is performed until the gap layer 17 is completely removed, the main magnetic pole layer 15 is not subjected to etching. Thus, in the process of forming the auxiliary magnetic pole layer 19, the thickness of the main magnetic pole layer 15 is maintained as the designed value so that the magnetic flux saturation in the main magnetic pole layer 15 hardly occurs. Therefore, the high performance and stability in the writing performance can be achieved.

Here, the technical significance of the present invention will be mentioned where the auxiliary magnetic pole layer 19 is partially overlapped on the gap layer 17.

That is, in the process of manufacturing the thin film magnetic head of the comparative example described above, even if an attempt is made so that the rear edge of the gap layer 17 positionally corresponds to the front edge of the auxiliary magnetic pole layer 19, the position of the auxiliary magnetic pole layer 19 may be unintentionally shifted. In this case, the front edge of the auxiliary magnetic pole layer 19 may be located backward from the rear edge of the gap layer 17 (refer to FIGS. 10A and 10B), or the front edge of the auxiliary magnetic pole layer 19 may be projected from the rear edge of the gap layer 17. In the latter case, the auxiliary magnetic pole layer 19 may be partially overlapped on the gap layer 17. Such configuration formally coincides with the configuration of the case in the present invention. However, in this case, the auxiliary magnetic pole layer 19 is slightly overlapped on the gap layer 17 only within the range of the dimension error and position error. Thus, the overlapping length is not sufficient for protecting the main magnetic pole layer 15 using the gap layer 17 as the etching stopper layer during the etching process. The reason is as follows. According to the conditions such as the etching angle, not only the seed layer 61 but also the plating layer 19B may shift backward by the etching. Therefore unless the auxiliary magnetic pole layer 19 is fully stacked on the gap layer 17, the overlapping portion of the auxiliary magnetic pole layer 19 may disappear during the etching process and the gap G is produced. As a result, similar to the case shown in FIGS. 11A and 11B, the main magnetic pole layer 15 is also subjected to etching.

On the other hand, in the method of manufacturing the thin film magnetic head of the embodiment, the auxiliary magnetic pole layer 19 is partially overlapped on the gap layer 17 with an intention of considering that the position of the auxiliary magnetic pole layer 19 may be unintentionally shifted, or the plating layer 19B may be recessed by the etching during the etching process. That is, even if the shift in the position or the recess is produced, the auxiliary magnetic pole layer 19 is partially overlapped on the gap layer 17 with a certainty at the time that the thin film magnetic head is completed; thereby the overlapping length L4 is set. Therefore, the gap G is not produced during the etching process so that the main magnetic pole layer 15 is not subjected to etching. Therefore, the technical significance of the present invention is not that the auxiliary magnetic pole layer 19 is partially overlapped on the gap layer 17 without an intention, merely due to the dimension error and the position error. The technical significance of the present invention is that the auxiliary magnetic pole layer 19 is partially overlapped on the gap layer 17 with an intention by setting the overlapping length L4 in consideration of the amount of position error and the amount of recess.

In the embodiment, the overall configuration of the thin film magnetic head is shown in FIGS. 1A and 1B. However, it is not necessarily limited to this. For example, as shown in FIGS. 12A and 12B to 15A and 15B in correspondence with FIGS. 1A and 1B, the configuration of the thin film magnetic head can be freely modified as long as the auxiliary magnetic pole layer 19 is partially overlapped on the gap layer 17.

Figures 12A, 12B:
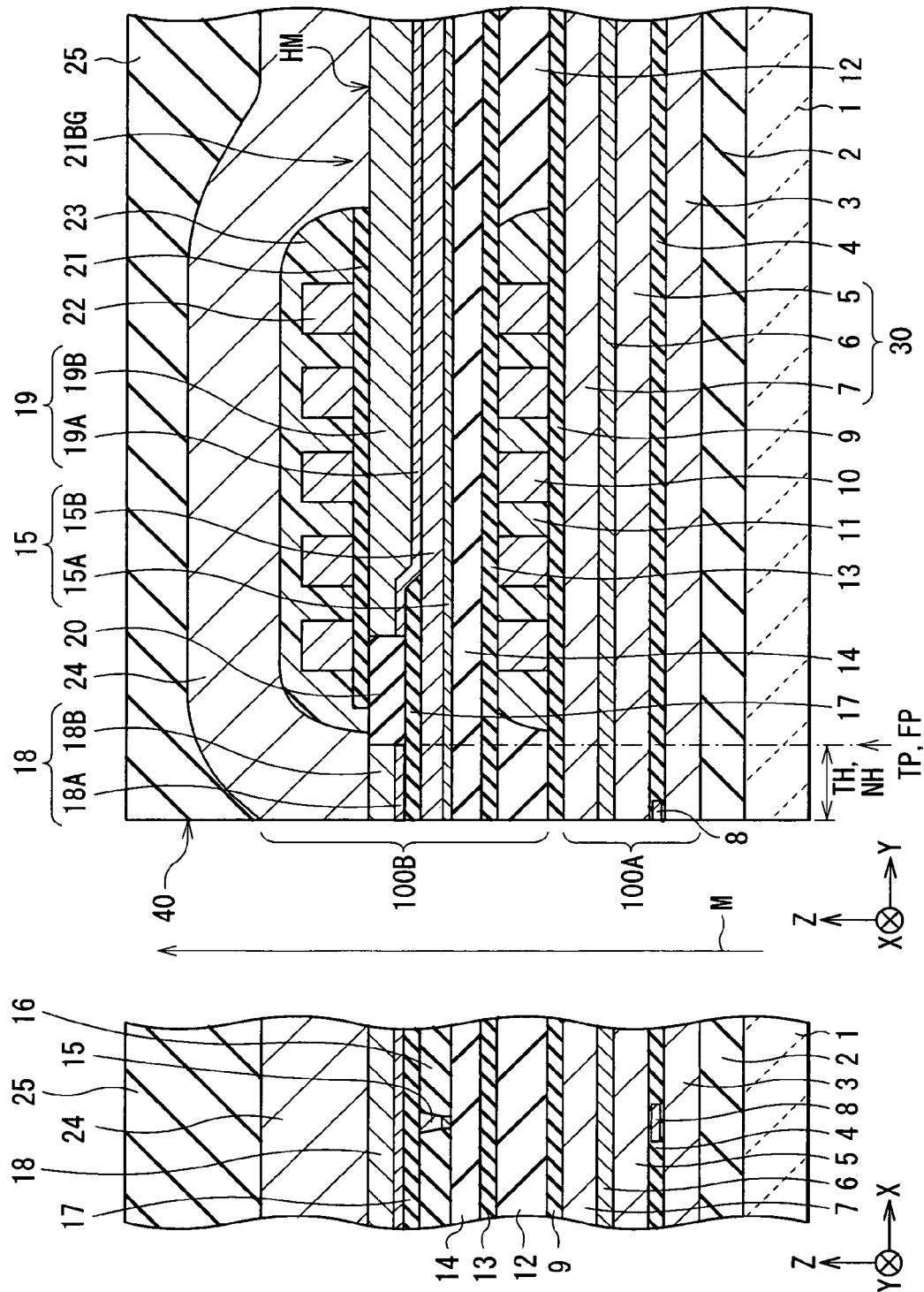
FIGS. 12A and 12B are cross sectional views showing a modification regarding the configuration of the thin film magnetic head.

Specifically, in FIGS. 1A and 1B, the rear end face of the gap layer 17 is set substantially perpendicular to the surface of the main magnetic pole layer 15. However, as shown in FIGS. 12A and 12B, the rear end face of the gap layer 17 may be inclined as its thickness is gradually decreased toward the rear. After forming the gap layer 17, this rear end face can be formed by selectively performing angled-etching and patterning. In this case, the portion of the auxiliary magnetic pole layer 19 located adjacent to the gap layer 17 is also similarly inclined according to the inclination of the rear end face of the gap layer 17.

In case of FIGS. 12A and 12B, further, the main magnetic pole layer 15 is partially depressed in the rear region from the gap layer 17 as in FIGS. 13A and 13B; thereby the auxiliary magnetic pole layer 19 may be extended on the leading side. After forming the main magnetic pole layer 15, this depression can be formed by selectively etching and digging the main magnetic pole layer 15.

Figures 14A, 14B:
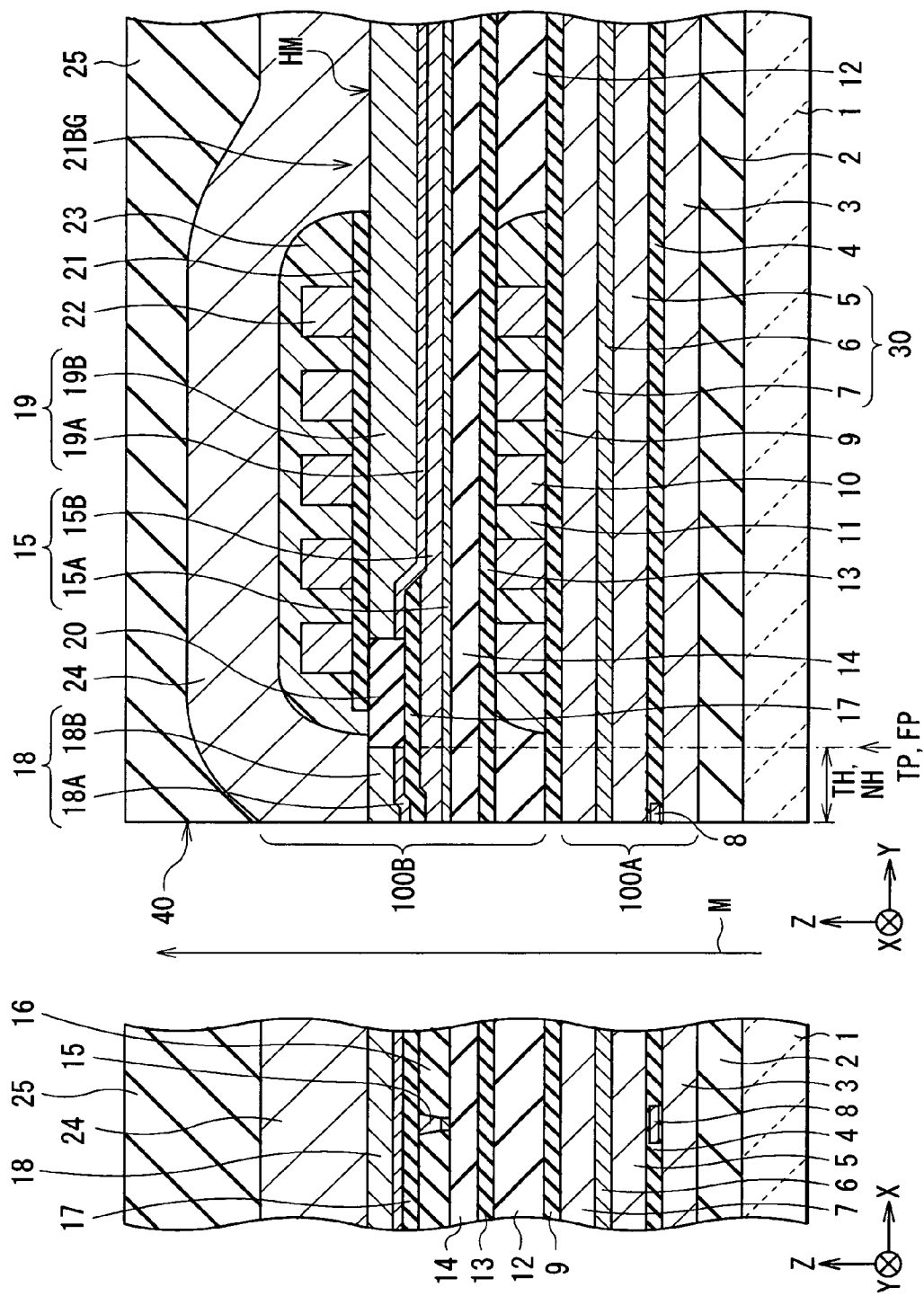
FIGS. 14A and 14B are cross sectional views showing still another modification regarding the configuration of the thin film magnetic head.

In case of FIGS. 13A and 13B, further, the main magnetic pole layer 15 is partially depressed in the front region from the throat height zero position TP as in FIGS. 14A and 14B; thereby the gap layer 17 may be extended along the depression. This depression can be formed in the same process as forming the depression of the main magnetic pole layer 15 described above. In this case, the write shield layer 18 is extended on the leading side according to the depression of the main magnetic pole layer 15.

Figures 15A, 15B:
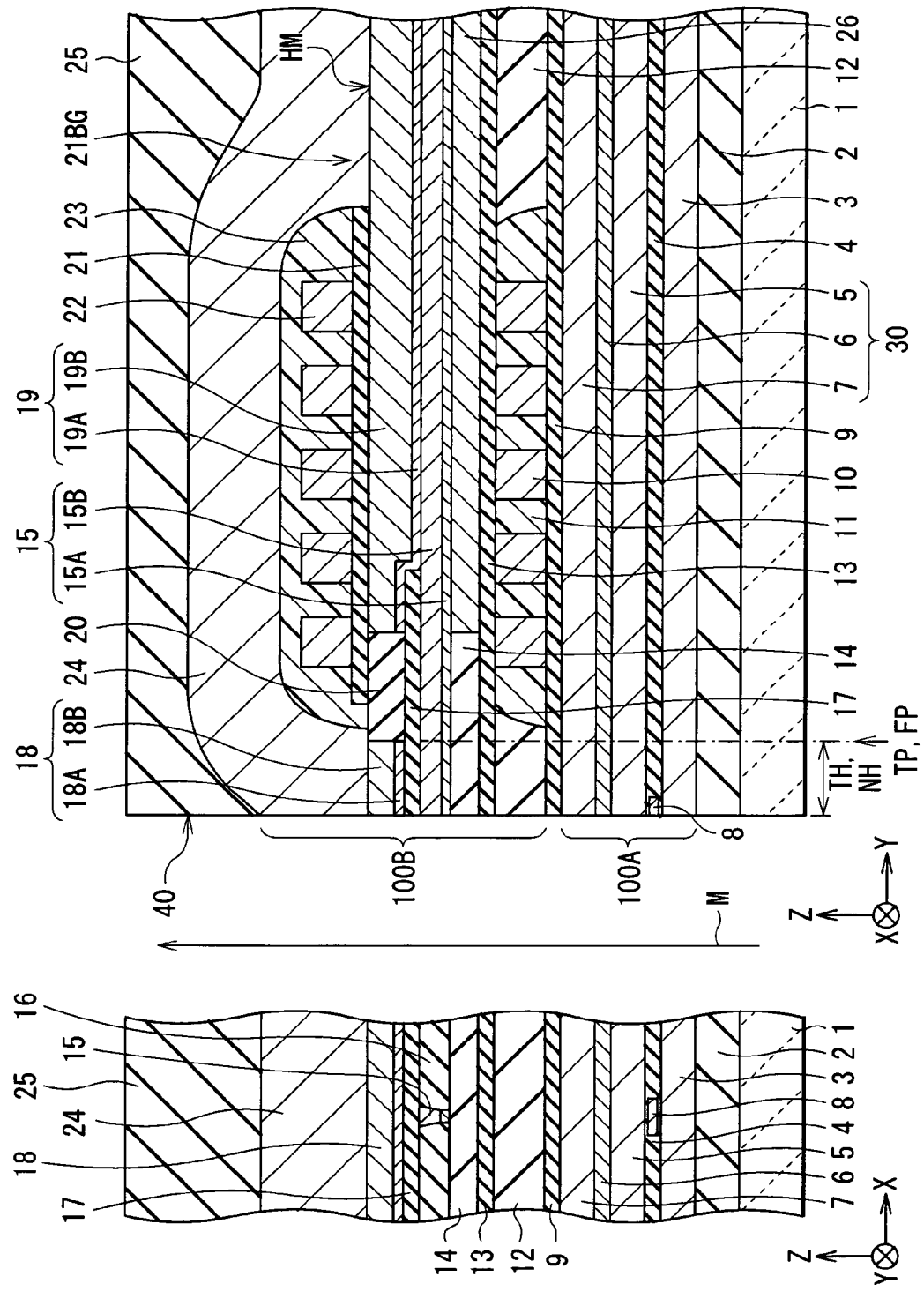
FIGS. 15A and 15B are cross sectional views further showing still another modification regarding the configuration of the thin film magnetic head.

Also in FIGS. 1A and 1B, only the auxiliary magnetic pole layer 19 is provided on the trailing side of the main magnetic pole layer 15. However, as shown in FIGS. 15A and 15B, the auxiliary magnetic pole layer 26 may be provided as well on the leading side of the main magnetic pole layer 15. The auxiliary magnetic pole layer 26 has the same function as the auxiliary magnetic pole layer 19, and the periphery of the auxiliary magnetic pole layer 26 is filled by the insulating layer 14. In this case, the magnetic flux is supplied to the main magnetic pole layer 15 from both of the auxiliary magnetic pole layers 19 and 26; thereby the intensity of the perpendicular magnetic field can be increased.

Needless to say, each of the modifications shown in FIGS. 12A and 12B to 15A and 15B may be arbitrarily combined.

In the embodiment, as shown in FIGS. 5A and 5B to 8A and 8B, the write shield layer 18 and the auxiliary magnetic pole layer 19 are formed parallel to each other by commonly using the seed layer 61. However, it is not necessarily limited to this.

Each of them may be formed individually. Also in this case, the same effects as in the embodiment can be obtained.

Figure 16:
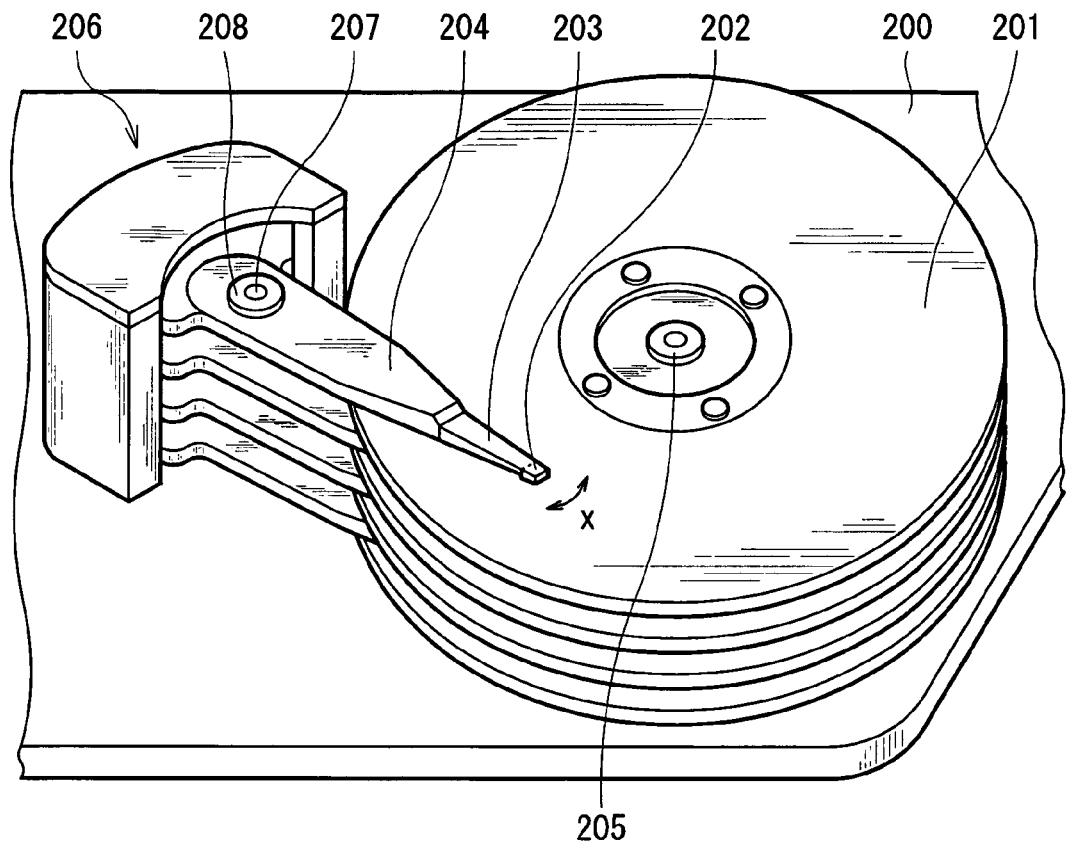
FIG. 16 is a perspective view showing the perspective configuration of a magnetic write device equipped with the thin film magnetic head according to an embodiment of the present invention.
Figure 17:
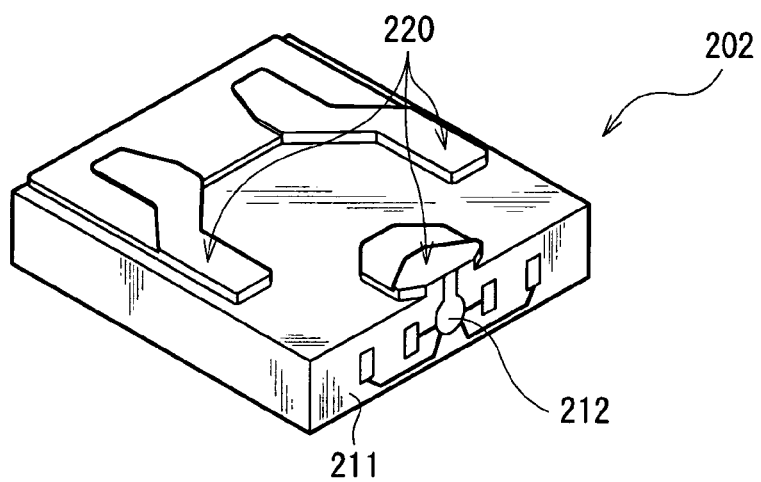
FIG. 17 is an enlarged perspective view showing the perspective configuration of main parts of the magnetic write device indicated in FIG. 16.

Successively, with reference to FIGS. 16 and 17, the configuration of the magnetic write device equipped with the thin film magnetic head described in the embodiment will be explained. FIGS. 16 and 17 show the configuration of the magnetic write device, FIG. 16 indicating the perspective configuration and FIG. 17 indicating the perspective configuration of the main parts, respectively.

The magnetic write device is, for example, the hard disk drive shown in FIG. 16 having, in a housing 200, a plurality of magnetic disks (for example, hard disks) 201 as a recording medium 50 (refer to FIG. 4) where the information is magnetically written, a plurality of suspensions 203 disposed corresponding to each of the magnetic disks 201 and supporting the magnetic head slider 202 at one end, and a plurality of arms 204 supporting the other end of the suspensions 203. The magnetic disk 201 is rotatable about a spindle motor 205 fixed on the housing 200. The arm 204 is connected to the drive section 206 as the power source. The arm 204 is turnable about the fixed pivot 207 fixed on the housing 200, through the bearing 208. The drive section 206 is, for example, configured including the drive source such as a voice coil motor. This magnetic write device is, for example, a model having a plurality of arms 204 being collectively turnable about the fixed pivot 207. In addition, FIG. 16 shows the housing 200 that is partially omitted so that the internal configuration of the magnetic write device is easily shown.

As shown in FIG. 17, the magnetic head slider 202 has a configuration that the tin film magnetic head 212 is attached on one face of a substrate 211 substantially having a rectangular solid configuration composed of non-magnetic insulating material such as AlTiC. The substrate 211 has, for example, one surface (the air bearing surface 220) provided with an uneven structure to decrease the air resistance generated during rotation of the arm 204. The thin film magnetic head 212 is attached on another face orthogonal to the air bearing surface 220 (the right front face in FIG. 17). The thin film magnetic head 212 has the configuration described in the embodiment. When the magnetic disk 201 is rotated during data writing mode or data reading mode, the magnetic head slider 202 uses the air flow generated between the writing face (the face opposed to the magnetic head slider 202) and the air bearing surface 220. Thus, the magnetic head slider 202 is levitated from the writing face of the magnetic disk 201. FIG. 17 shows the figure in the state upside-down of FIG. 16 so that the configuration on the air bearing surface 220 side of the magnetic head slider is easily shown.

In the magnetic write device, the arm 204 is turned during data writing mode or data reading mode of the information so that the magnetic head slider 202 travels to a predetermined region (the writing region) of the magnetic disk 201. When the thin film magnetic head 212 is supplied with electrical power in the opposing state to the magnetic disk 201, the thin film magnetic head 212 operates based on the operation principle described in the embodiment. Therefore, the writing and reading process are performed on the magnetic disk 201.

This magnetic write device is equipped with the thin film magnetic head 212 described in the embodiment. Therefore, the high performance and stability in the writing performance can be achieved.

The configuration, operation, action, effects and modifications of the thin film magnetic head 212 other than described above have been described already in the embodiment; thereby these descriptions will be omitted.

EXAMPLE

Successively, an example according to the present invention will be described.

A series of results were obtained when the writing performance of the thin film magnetic head (refer to FIGS. 1A and 1B to FIG. 4) described in the embodiment was examined.

Figure 18:
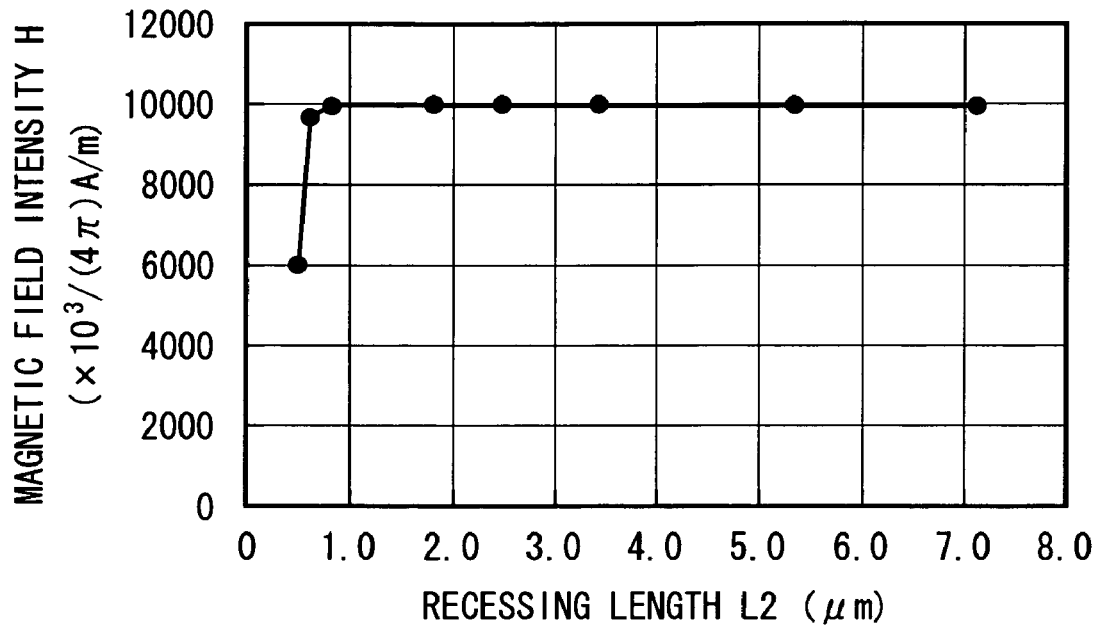
FIG. 18 is a view showing the relationship between a recessed distance of an auxiliary magnetic pole layer and intensity of perpendicular magnetic field.
Figure 19:
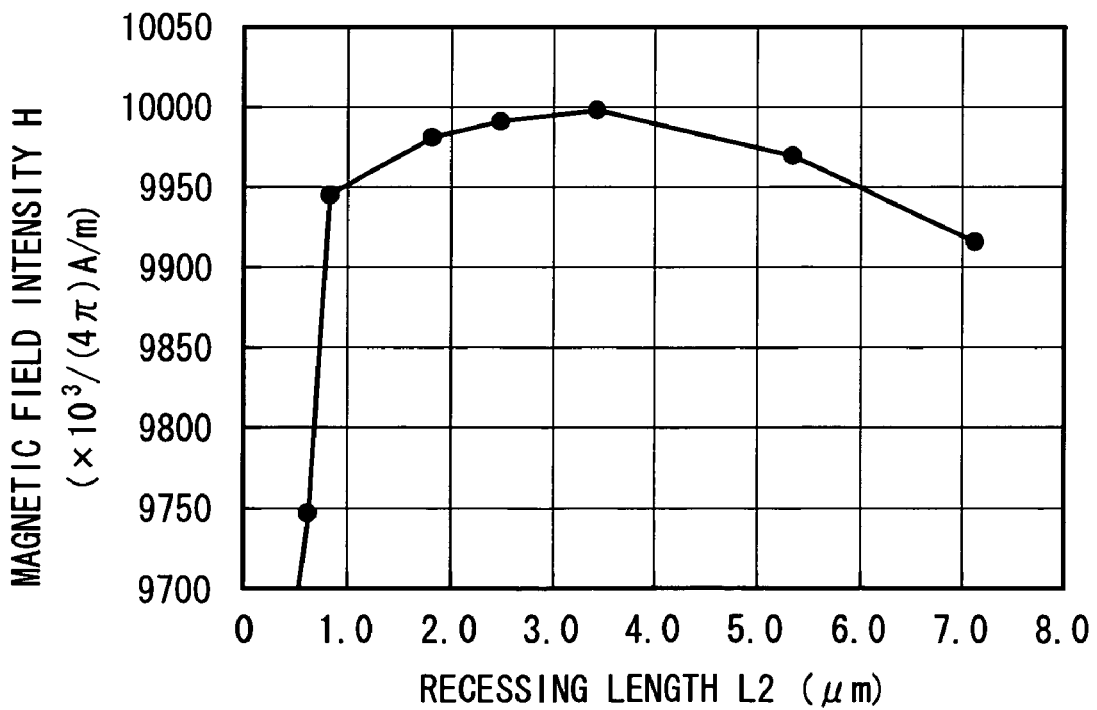
FIG. 19 is an enlarged view partially showing the relationship indicated in FIG. 18.

When the relationship between a recessing length L2 of an auxiliary magnetic pole layer 19 and the intensity of a perpendicular magnetic field was examined, the results were obtained as shown in FIGS. 18 and 19. In FIGS. 18 and 19, horizontal axes indicate the recessing length L2 (μm), and vertical axes indicate a magnetic field intensity H ($\times 10^3/(4\pi)$ A/m (=Oe)), respectively. In addition, the relationship shown in FIG. 19 indicates a part of the relationship shown in FIG. 18 (in the range that the magnetic field intensity H=$9700 \times 10^3/(4\pi)$ A/m to $10050 \times 10^3/(4\pi)$ A/m) in an enlarged way.

In this case, sputtering method was used as a method of forming a gap layer 17, and plating method was used as the method of forming an auxiliary magnetic pole layer 19, respectively. The main configuration conditions of the thin film magnetic head were as follows. The material of the gap layer 17 was alumina, and its thickness was 0.05 μm. The material of the auxiliary magnetic pole layer 19 was iron-cobalt-nickel alloy, its thickness was 0.5 μm, and the recessing length L2 of the auxiliary magnetic pole layer 19 was varied in the range of 0.5 μm to 7.1 μm. The operation conditions of the thin film magnetic head were as follows. The recording current was 0.03 A, and the number of turns of the thin film coils 10 and 22 are 4T (turns) so that the magnetomotive force was 0.12 AT. The retention force of a recording medium 50 was $4000 \times 10^3/(4\pi)$ A/m.

As understood from the results shown in FIG. 18, when seeing the range that the recessing length L2 was from 0.5 μm to 7.1 μm, the magnetic field intensity H was fully increased in the range that the recessing length L2 was 0.6 μm or above. Further, the magnetic intensity H became substantially constant in the range that the recessing length L2 was 0.8 μm or above. Specifically, the magnetic intensity H reached approximately $9700 \times 10^3/(4\pi)$ A/m or above in the range that the recessing length L2 was 0.6 μm or above. The magnetic field intensity H reached approximately $9900 \times 10^3/(4\pi)$ A/m or above in the range that the recessing length L2 was 0.8 μm or above. In this case, in particular, the magnetic field intensity H was examined in detail in the range that the recessing length L2 was 0.6 μm or above. As shown in FIG. 19, the magnetic field intensity H was varied with a curve line of an upward convex shape, and it reached the maximum (the magnetic field intensity H=$9999 \times 10^3/(4\pi)$ A/m) when the recessing length L2 was 3.4 μm. From this, in the thin film magnetic head of the present invention, it was confirmed that the intensity of the perpendicular magnetic field was maintained when the recessing length L2 was in the range of 0.6 μm to 7.1 μm, and preferably in the range of 0.8 μm to 7.1 μm.

Figure 20:
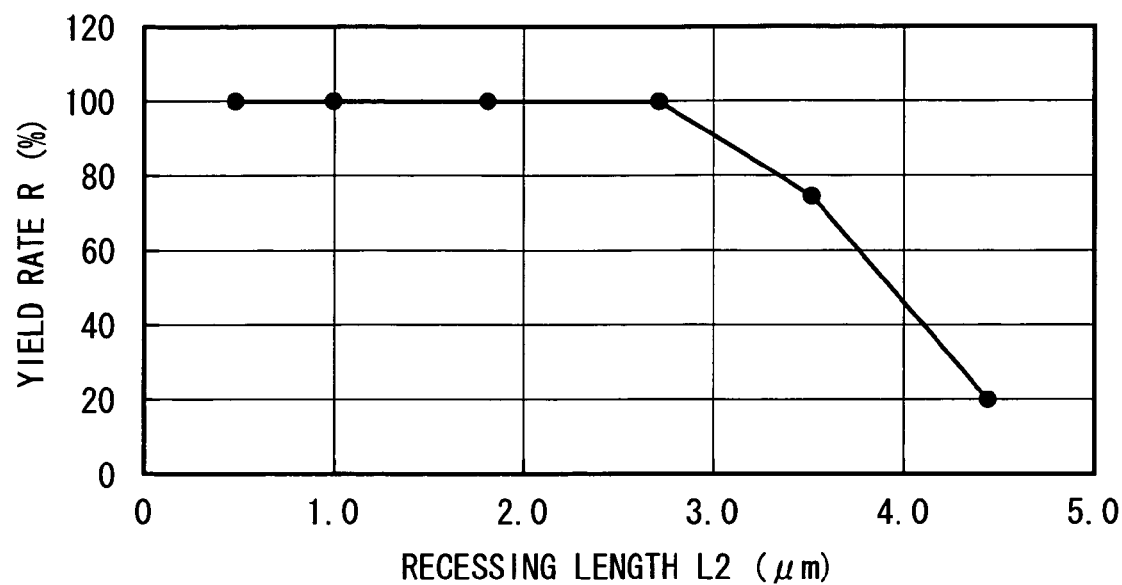
FIG. 20 is a view showing the relationship between the recessing length of the auxiliary magnetic pole layer and the occurrence of a pole erasure.

Successively, the relationship between the recessing length L2 and the occurrence of pole erasure was examined, and the results shown in FIG. 20 were obtained. In FIG. 20, the horizontal line shows the recessing length L2 (μm) and the vertical line shows the yield rate R (%), respectively. Here, the yield rate R was examined while the recessing length L2 was varied in the range of 0.50 μm to 4.44 μm, and the occurrence of the pole erasure was evaluated. Except the above, the conditions were the same as in the cases of FIGS. 18 and 19.

In order to examine the yield rate R, the writing process was performed on the recording medium 50 when the thin film coils 10 and 22 are supplied with electrical power (the writing state). Next, when the thin film coils 10 and 22 are not supplied with electric power (the non-writing state), the recording medium 50 was traced in the same way as in the writing state. Then the read process was performed on the recording medium 50. The writing signal intensity S1 before the trace and the reading signal intensity S2 after the trace were examined. As a result, the attenuation rate of the signal intensity between before and after the trace was calculated as: the signal intensity ratio S (%)=(S2/S1)×100. If the signal intensity ratio S was 85% or above, it was recognized as non-defective. The yield rate R was the rate of the non-defective items when the number of measurements (a so-called n-number) was 40 for each recessing length L2.

As understood from the results in FIG. 20, the yield rate R became constant and then was decreased as the recessing length L2 was increased. Here, in the process of manufacturing the thin film magnetic head, in case the threshold of the tolerable yield rate R was set as 90%, the condition was met when the recessing length L2 was in the range of 3.0 μm or below. In this case, in particular, the yield rate R was uniformly 100% when the recessing length L2 was 2.7 μm or below. Therefore, in the thin film magnetic head of the present invention, it was confirmed that the pole erasure was suppressed when the recessing length L2 was in the range of 3.0 μm or below, and preferably in the range of 2.7 μm or below.

From the series of the results shown in FIGS. 18 to 20, in the thin film magnetic head of the present invention, it was derived that the perpendicular magnetic field intensity was maintained while suppressing the pole erasure, when the recessing length L2 was in the range of 0.6 μm to 3.0 μm, and preferably in the range of 0.8 μm to 3.0 μm. In this case, further, it was also derived that the better effects could be obtained when the recessing length L2 was in the range of 0.6 μm to 2.7 μm, and preferably in the range of 0.8 μm to 2.7 μm.

Figure 21:
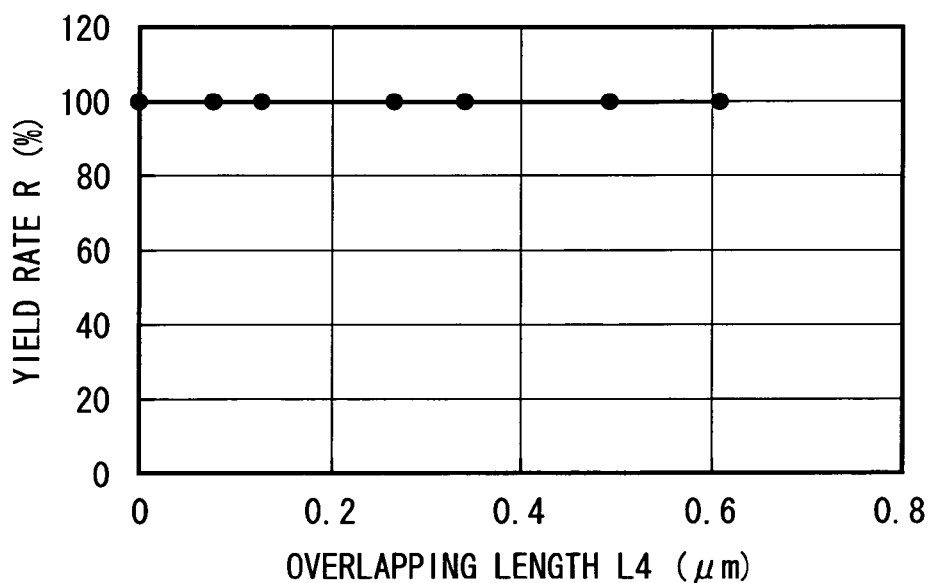
FIG. 21 is a view showing the relationship between overlapping length and the occurrence of the pole erasure.

Finally, as it was confirmed that the recessing length L2 of the auxiliary magnetic pole layer 19 influences the occurrence of the pole erasure, it was examined whether or not the occurrence condition of the pole erasure was changed, in case the auxiliary magnetic pole layer 19 was partially overlapped on the gap layer 17. The results shown in FIG. 21 were obtained. In FIG. 21, the horizontal line indicates the overlapping length L4 (=L1−L2; μm) and the vertical line indicates the yield rate R (%). Here, the yield rate R was examined while the overlapping length L4 was varied in the rage of 0 μm to 0.61 μm, and the occurrence of the pole erasure was evaluated. Except the above, the conditions were the same as in the cases of FIGS. 18 and 19.

As understood from the results shown in FIG. 21, the yield rate R became 100% without respect to the value of the overlapping length L4. This result indicated that the occurrence of the pole erasure was not influenced although the overlapping distance L4 was varied. From this, in the thin film magnetic head of the present invention, it was confirmed that the pole erasure was suppressed even if the auxiliary magnetic pole layer 19 was partially overlapped on the gap layer 17.

Hereinbefore, the present invention was described with the embodiment and the example. However, the present invention is not limited to these as various modifications are available. Specifically, in the embodiment, the modifications with respect to the configuration of the main parts are described with reference to FIGS. 12A and 12B to 15A and 15B. However, it is not limited to these. The parts except the main parts can be also arbitrarily varied. As an example, only the thin film coil 22 may be provided instead of providing both the thin film coils 10 and 22. In this case, the same effects as in the embodiment and example can also be obtained.

Also, in the embodiment, the case is explained where the present invention is applied to the thin film magnetic head of the composite type. However, it is not limited to this. It is also applicable to the thin film magnetic head for only writing which has the induction-type magnetic conversion element for writing, and the thin film magnetic head which has the induction-type magnetic conversion element for both write and read. Needless to say, the present invention is also applicable to the thin film magnetic head having the structure that the element for writing and the element for reading are stacked in a reverse order.

The perpendicular magnetic write head and the method of manufacturing the same, and the magnetic write device according to the present invention are applicable to the hard disk drive or the like such that the information is magnetically written on the hard disk.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic write head comprising:
   a thin film coil generating a magnetic flux;
   a main magnetic pole layer extending backward from an air bearing surface facing onto a recording medium and leading the magnetic flux generated in the thin film coil to the recording medium;
   a gap layer extending backward from the air bearing surface on a trailing side of the main magnetic pole layer;
   an auxiliary magnetic pole layer extending backward from a position recessed from the air bearing surface on the trailing side of the main magnetic pole layer;
   a return yoke layer extending backward from the air bearing surface on a trailing side of the gap layer and the auxiliary magnetic pole layer, and being coupled to the auxiliary magnetic pole layer on a side away from the air bearing surface; and
   a write shield layer disposed on a side close to the air bearing surface between the gap layer and the return yoke layer;
   wherein the auxiliary magnetic pole layer is partially overlapped on the gap layer in a region between the write shield layer and a connection part of the auxiliary magnetic pole layer and the return yoke layer, and the auxiliary magnetic layer is partially connected to the main magnetic pole,
   a rear edge of the gap layer is disposed in the region between the write shield layer and the connection part of the auxiliary magnetic pole layer and the return yoke layer, and recessed from a front edge of the auxiliary magnetic pole layer, and
   the front edge of the auxiliary magnetic pole layer is disposed in the region between the write shield layer and the connection part of the auxiliary magnetic pole layer and the return yoke layer, and recessed from a rear edge of the write shield layer.

2. The perpendicular magnetic write head according to claim 1,
   wherein a distance from the air bearing surface to the auxiliary magnetic pole layer is in the range of 0.6 mm to 3.0 mm.

3. The perpendicular magnetic write head according to claim 2,
   wherein the distance from the air bearing surface to the auxiliary magnetic pole layer is in the range of 0.8 mm to 3.0 mm.

4. The perpendicular magnetic write head according to claim 1,
wherein the write shield layer disposed to be included in the same layer level as the auxiliary magnetic pole layer.

5. The perpendicular magnetic write head according to claim 4,
wherein the width, in the write track width direction on the air bearing surface, of the write shield layer is larger than that of the main magnetic pole layer.

6. The perpendicular magnetic write head according to claim 4 further comprising:
a first insulating layer filled between the auxiliary magnetic pole layer and the write shield layer and defining a throat height with a position adjacent to the write shield layer
a second insulating layer disposed on the trailing side of the first insulating layer and burying the thin film coil.

7. The perpendicular magnetic write head according to claim 6,
wherein a front edge of the second insulating layer is located backward from the front edge of the first insulating layer.

8. The perpendicular magnetic write head according to claim 6,
wherein a front edge of the auxiliary magnetic pole layer is located backward from the front edge of the second insulating layer.

9. A method of manufacturing a perpendicular magnetic write head provided with a thin film coil generating a magnetic flux, a main magnetic pole layer leading the magnetic flux generated in the thin film coil to a recording medium, and a gap layer, an auxiliary magnetic pole layer, a write shield layer and a return yoke layer disposed on a trailing side of the main magnetic pole layer, the method comprising steps of:
forming the main magnetic pole layer extending backward from an air bearing surface facing onto a recording medium;
forming the gap layer extending backward from the air bearing surface on the main magnetic pole layer;
forming a seed layer covering the main magnetic pole layer and the gap layer, the seed layer being used for deposition of a plating layer;
selectively depositing the plating layer extending backward from a position recessed from the air bearing surface on the seed layer;
selectively removing the seed layer using the plating layer as a mask, thereby forming the auxiliary magnetic pole layer including the seed layer and the plating layer;
forming the write shield layer on the gap layer; and
forming the return yoke layer extending backward from the air bearing surface on the write shield layer and the auxiliary magnetic pole layer,
wherein the auxiliary magnetic pole layer is partially overlapped on the gap layer in a region between the write shield layer and a connection part of the auxiliary magnetic pole layer and the return yoke layer,
a rear edge of the gap layer is disposed in the region between the write shield layer and the connection part of the auxiliary magnetic pole layer and the return yoke layer, and recessed from a front edge of the auxiliary magnetic pole layer, and
the front edge of the auxiliary magnetic pole layer is disposed in the region between the write shield layer and the connection part of the auxiliary magnetic pole layer and the return yoke layer, and recessed from a rear edge of the write shield layer.

10. A magnetic write device equipped with a recording medium and a perpendicular magnetic write head which writes information on the recording medium comprising:
a thin film coil generating a magnetic flux;
a main magnetic pole layer extending backward from an air bearing surface facing onto a recording medium and leading the magnetic flux generated in the thin film coil to the recording medium;
a gap layer extending backward from the air bearing surface on a trailing side of the main magnetic pole layer;
an auxiliary magnetic pole layer extending backward from a position recessed from the air bearing surface on the trailing side of the main magnetic pole layer;
a return yoke layer extending backward from the air bearing surface on a trailing side of the gap layer and the auxiliary magnetic pole layer, and being coupled to the auxiliary magnetic pole layer on a side away from the air bearing surface; and
a write shield layer disposed on a side close to the air bearing surface between the gap layer and the return yoke layer;
wherein the auxiliary magnetic pole layer is partially overlapped on the gap layer in a region between the write shield layer and a connectionpart of the auxiliary magnetic pole layer and the return yoke layer, and the auxiliary magnetic layer is partially connected to the main magnetic pole,
a rear edge of the gap layer is disposed in the region between the write shield layer and the connection part of the auxiliary magnetic pole layer and the return yoke layer, and recessed from a front edge of the auxiliary magnetic pole layer, and
the front edge of the auxiliary magnetic pole layer is disposed in the region between the write shield layer and the connection part of the auxiliary magnetic pole layer and the return yoke layer, and recessed from a rear edge of the write shield layer.

11. The magnetic write device according to claim 10,
wherein the recording medium has a stacked configuration including a magnetization layer and a soft magnetic layer.

\* \* \* \* \*